United States Patent
Nambi et al.

(10) Patent No.: US 12,226,895 B1
(45) Date of Patent: Feb. 18, 2025

(54) ROBOTIC END EFFECTORS HAVING FINGERS AND NAILS TO GRASP AND CAGE ITEMS

(71) Applicant: Amazon Technologies, Inc., Seattle, WA (US)

(72) Inventors: Manikantan Nambi, Malden, MA (US); Chaitanya Mitash, Waltham, MA (US); Gregory Coleman, Somerville, MA (US); Timothy G. Dietz, Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 816 days.

(21) Appl. No.: 17/398,838

(22) Filed: Aug. 10, 2021

(51) Int. Cl.
| | |
|---|---|
| *B25J 15/00* | (2006.01) |
| *B25J 9/16* | (2006.01) |
| *B25J 15/06* | (2006.01) |
| *B25J 15/12* | (2006.01) |

(52) U.S. Cl.
CPC ............ *B25J 15/12* (2013.01); *B25J 9/1612* (2013.01); *B25J 15/0004* (2013.01); *B25J 15/0009* (2013.01); *B25J 15/0028* (2013.01); *B25J 15/0683* (2013.01)

(58) Field of Classification Search
CPC B25J 15/0004; B25J 15/0028; B25J 15/0052; B25J 15/0616; B25J 15/12; B25J 9/1612; B25J 9/1664; B25J 9/1697
See application file for complete search history.

(56) References Cited

U.S. PATENT DOCUMENTS

| | | | |
|---|---|---|---|
| 5,024,575 A * | 6/1991 | Anderson | B65G 47/90 414/737 |
| 7,549,688 B2 * | 6/2009 | Hayakawa | B25J 9/0009 294/902 |
| 10,556,338 B1 * | 2/2020 | Marchese | B25J 15/0475 |
| 10,800,045 B1 | 10/2020 | Jonas et al. | |
| 10,919,151 B1 * | 2/2021 | Marchese | B65G 1/1373 |
| 2016/0114482 A1 * | 4/2016 | Lessing | B25J 15/12 294/196 |

\* cited by examiner

*Primary Examiner* — Dean J Kramer
(74) *Attorney, Agent, or Firm* — Athorus, PLLC

(57) ABSTRACT

Robotic end effectors may include a suction cup, one or more grasping fingers, and one or more flexible nails to securely and reliably engage, grasp, and cage items. The grasping fingers may move between open and closed positions to grasp items. In addition, the flexible nails may be coupled to ends of the grasping fingers to facilitate caging of items by the fingers and nails. For example, the flexible nails may bend, flex, or slide under, around, or relative to items and thereby enable grasping and caging of portions of items by the fingers and nails. The nails may be formed of various materials, with various layers or thicknesses of materials, and/or with variable flexibility or friction properties. Further, the nails may be transitioned or actuated between multiple configurations, including a sliding configuration and a grasping configuration.

20 Claims, 11 Drawing Sheets

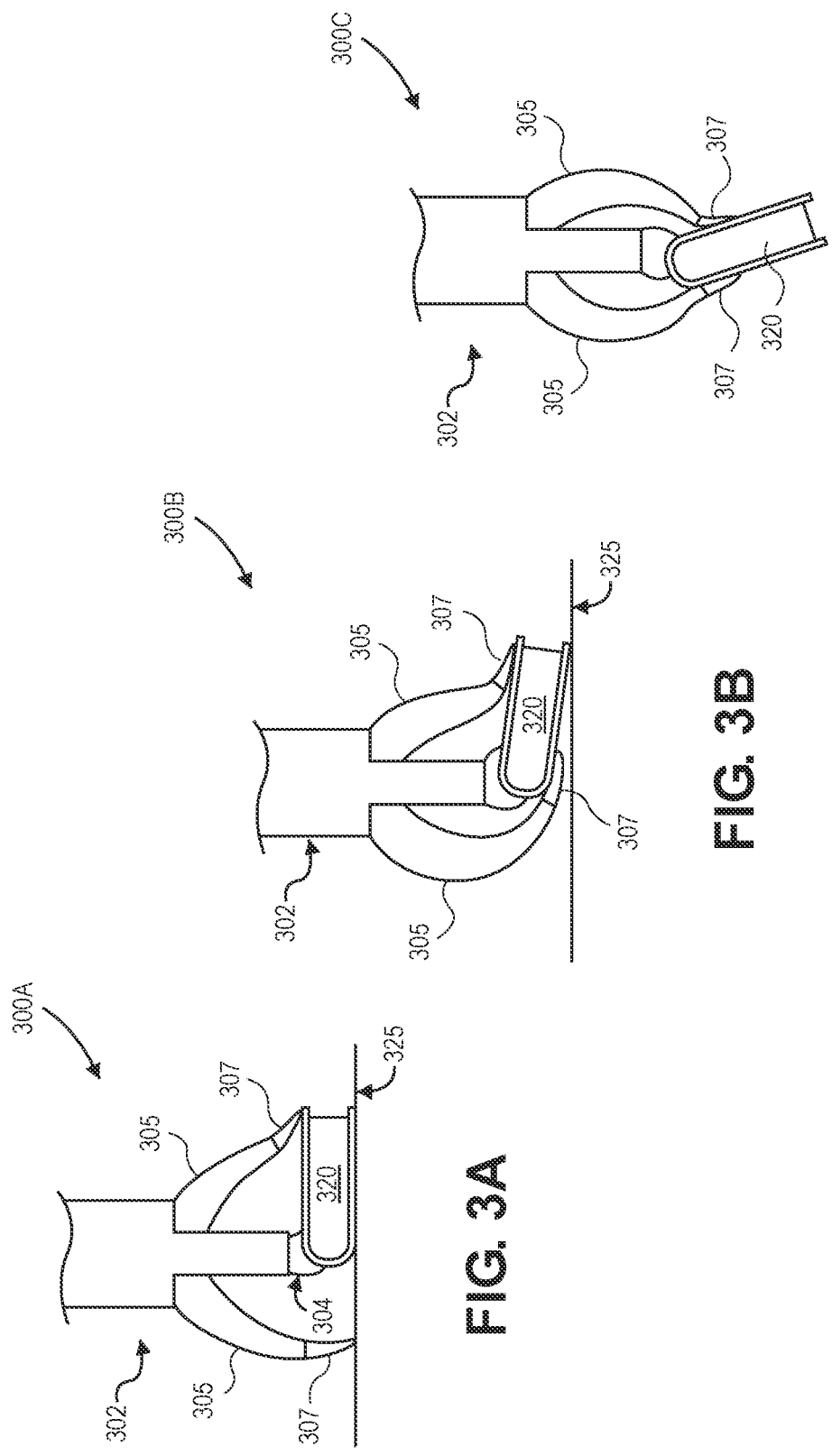

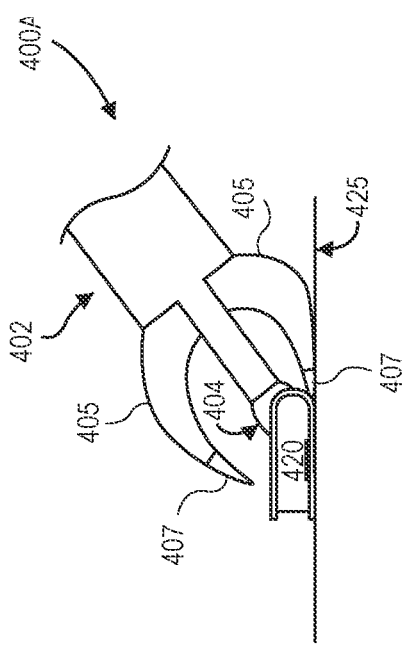
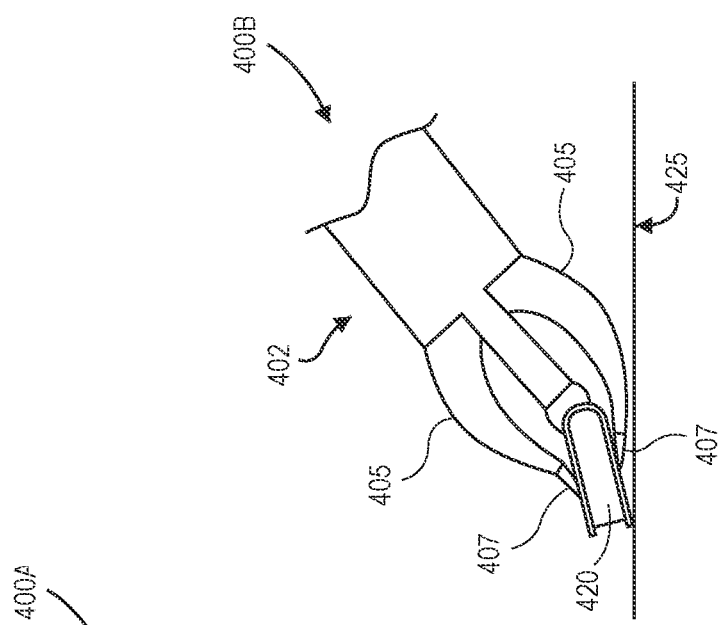
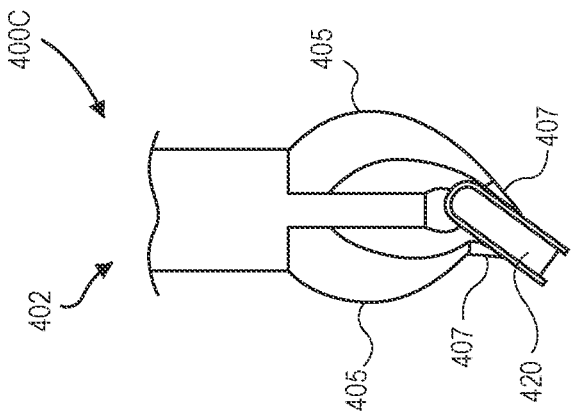

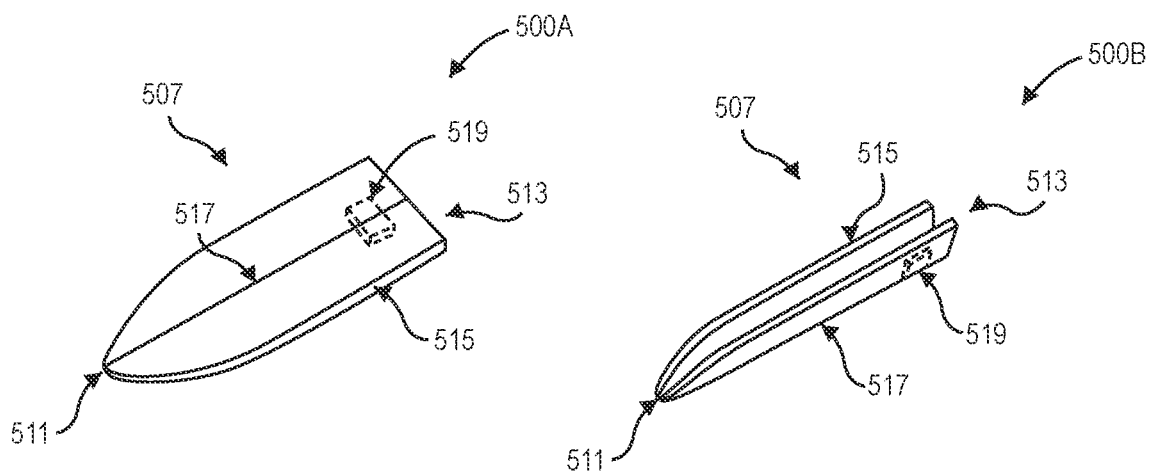
FIG. 5A  FIG. 5B
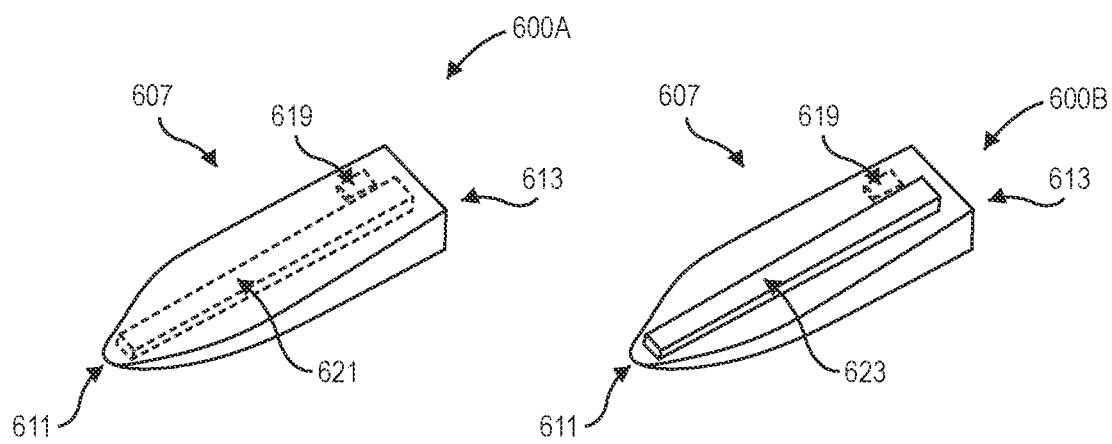
FIG. 6A  FIG. 6B

ROBOTIC END EFFECTORS HAVING FINGERS AND NAILS TO GRASP AND CAGE ITEMS

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes often incur significant cost and time. For example, conventional material handling systems such as robotic arms and associated robotic end effectors may use suction or pinchers to grasp objects, but the robotic end effectors may have difficulty grasping books, containers with movable lids, items in flexible packaging, or other types of movable or flexible items and/or packaging. Accordingly, there is a need for safe, reliable, and efficient automated systems and methods to facilitate the various material handling processes within a material handling facility, thereby improving the speed, reliability, and efficiency of such processes.

BRIEF DESCRIPTION OF THE DRAWINGS

FIGS. 3A-3C are schematic diagrams of an example item grasping process using a robotic end effector having fingers and nails, in accordance with implementations of the present disclosure.

FIGS. 4A-4C are schematic diagrams of another example item grasping process using a robotic end effector having fingers and nails, in accordance with implementations of the present disclosure.

FIGS. 5A and 5B are schematic diagrams of an example nail of a robotic end effector in a first configuration and a second configuration, respectively, in accordance with implementations of the present disclosure.

FIGS. 6A and 6B are schematic diagrams of another example nail of a robotic end effector in a first configuration and a second configuration, respectively, in accordance with implementations of the present disclosure.

DETAILED DESCRIPTION

Figure 1:
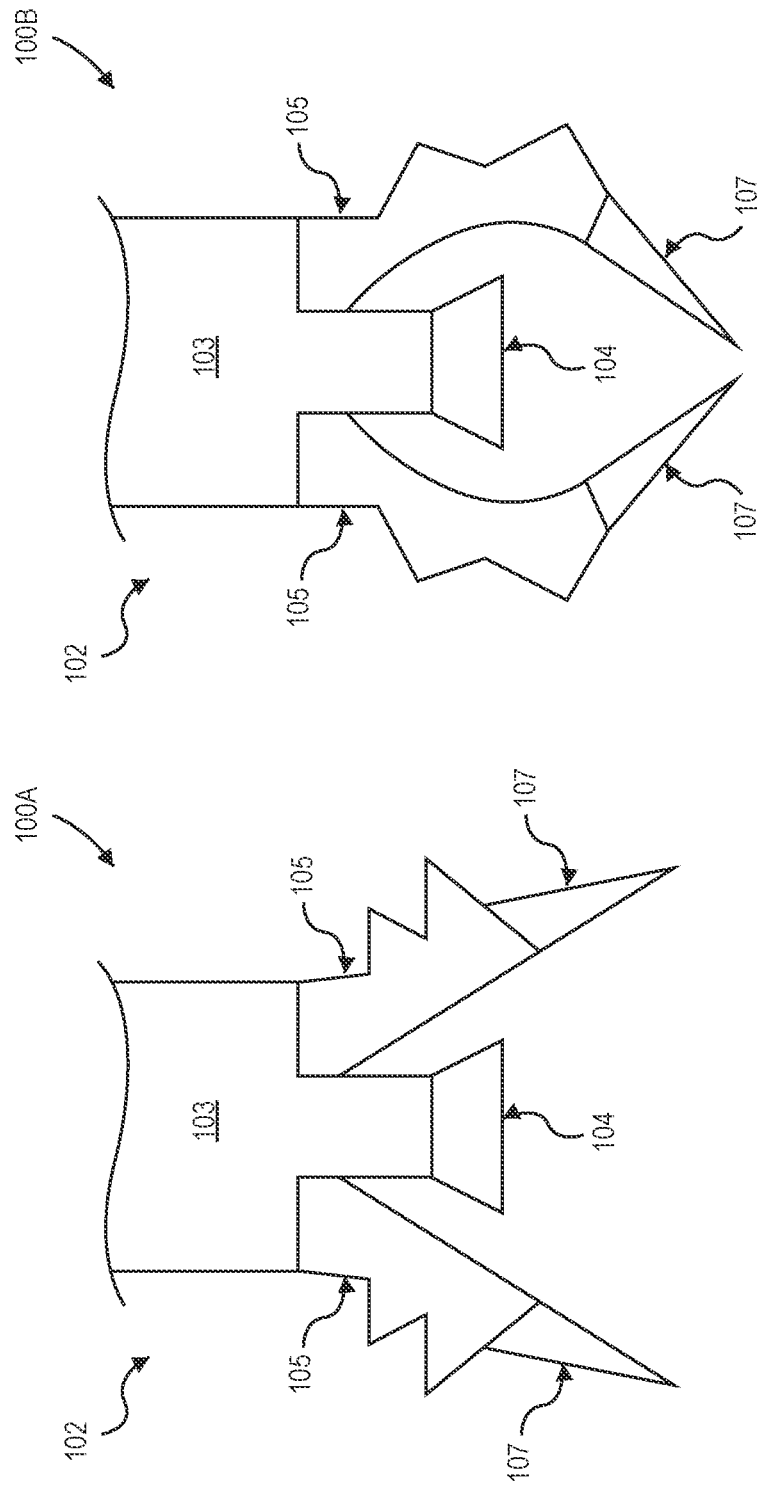
FIGS. 1A and 1B are schematic diagrams of an example robotic end effector having fingers and nails in an open position and a closed position, respectively, in accordance with implementations of the present disclosure.

As is set forth in greater detail below, implementations of the present disclosure are directed to robotic end effectors for robotic arms that can grasp and cage items using a combination of suction cups, grasping fingers, and/or flexible nails.

The end effectors described herein may grasp various types of items more reliably and efficiently, while also reducing the potential for damage to such items during grasping and movement. For example, the items may comprise books, magazines, notebooks, notepads, or other similar items that may have one or more movable, openable, or flexible portions. In addition, the items may comprise boxes or containers that may have one or more movable, openable, or flexible lids, covers, or other portions. Further, the items may comprise items in bags, plastic bags, flexible packaging, or other types of movable, openable, or flexible packaging. Various other types of items may also be grasped more reliably and efficiently by the end effectors described herein.

In example embodiments, the end effectors described herein may include one or more suction cups to engage one or more portions of an item. In addition, the end effectors may include one or more grasping fingers to grasp and cage an item. Further, one or more of the grasping fingers may also include respective flexible nails to facilitate grasping and caging of an item. In some example embodiments, grasping of an item may comprise gripping, pinching, holding, squeezing, or otherwise grabbing an item via one or more portions of the item, and caging of an item may comprise surrounding, enveloping, encircling, restraining, constraining, or otherwise enclosing one or more portions, or substantially all portions, of an item.

The one or more grasping fingers may move between at least two positions, e.g., an open position and a closed position. In the open position, the grasping fingers may release an item, and in the closed position, the grasping fingers may grasp an item. For example, various types of actuators, such as pneumatic actuators, servos, solenoids, motors, shape memory alloys, or combinations thereof, may cause the grasping fingers to move between at least the open position and the closed position. Further, the grasping fingers may be formed of various materials, such as silicone, rubber, plastics, composites, metals, or combinations thereof, that may provide flexibility, elasticity, and/or stiffness to portions of the grasping fingers, and may also have various friction properties to grasp an item.

The one or more flexible nails may be coupled to ends of respective grasping fingers, and the flexible nails may also move between at least two configurations, e.g., a first, sliding configuration or position that may generally correspond to the open position of the grasping fingers, and a second, grasping configuration or position that may generally correspond to the closed position of the grasping fingers. In the first, sliding configuration or position, the flexible nails may slide relative to a portion of the item and/or relative to a support surface proximate the item. In the second, grasping configuration or position, the flexible nails may substantially cage or grasp the item.

The flexible nails may be formed of various materials, such as silicone, rubber, plastics, composites, metals, or combinations thereof, that may provide flexibility, elasticity, and/or stiffness to portions of the flexible nails, and may also have various friction properties to grasp an item. In addition, the flexible nails may have variable flexibility along respective lengths of the flexible nails, which may be effected by different materials, different numbers of layers of materials, and/or different thicknesses of materials along the lengths of the flexible nails. Further, the flexible nails may have variable friction properties along respective lengths of the flexible nails, which may be effected by different materials along the lengths of the flexible nails. Generally, tips or ends of the flexible nails may have greater flexibility and lower friction to enable sliding of the flexible nails relative to an item, and portions of the flexible nails that are adjacent and/or coupled to the grasping fingers may have lower flexibility and higher friction to enable grasping of an item by the flexible nails.

In further example embodiments, the flexible nails may include actuators that move or transition the flexible nails between at least two positions or configurations, e.g., the first, sliding position or configuration and the second, grasping position or configuration. For example, the flexible nails may be extendible or retractable relative to respective grasping fingers to which they are coupled. In addition, the flexible nails may be foldable along respective lengths of the flexible nails, and may move or transition between an unfolded, sliding configuration and a folded, grasping configuration. Further, the flexible nails may include a stiffening rod that moves or transitions between a retracted, sliding configuration and an extended, grasping configuration. Moreover, the flexible nails may include a vibration transducer that emits a first vibration profile associated with a sliding configuration, and that emits a second vibration profile associated with a grasping configuration.

In additional example embodiments, a method to grasp items using robotic arms and the end effectors described herein may include receiving imaging data of an item, processing the imaging data, and/or determining at least one attribute or characteristic of the item based on the imaging data. Further, based on the determined attribute or characteristic of the item, an item grasp strategy may be generated that may include one or more of a grasp point, an approach trajectory, a grasp characteristic, and/or a movement characteristic for the item.

Using the generated item grasp strategy for the item, a robotic arm and end effector may be instructed to grasp the item. For example, the robotic arm and end effector may be positioned and oriented based on the grasp point and/or approach trajectory. In addition, the robotic arm and end effector may initiate grasping of the item based on a grasping type (such as picking, scooping, sliding, pushing, turning, re-orienting, etc.), grasping sequence, suction forces, grasping forces, other forces, or other grasp characteristics of the item. Further, the robotic arm and end effector may move or transfer the grasped item based on a movement type, movement sequence, direction, speed, acceleration, or other movement characteristics of the item.

The end effectors and associated methods to grasp items described herein may enable reliable and efficient grasping of various types of items by using combinations of suction, grasping, pinching, sliding, scooping, lifting, caging, and/or other types of grasping movements. Further, the end effectors and associated methods to grasp items described herein may also reduce the potential for opening, stretching, ripping, tearing, dropping, or otherwise damaging such items during grasping and movement.

FIGS. 1A and 1B are schematic diagrams 100A, 100B of an example robotic end effector having fingers and nails in an open position and a closed position, respectively, in accordance with implementations of the present disclosure.

The example robotic end effector 102 may include an actuator 103, a suction cup 104, one or more grasping fingers 105, and one or more flexible nails 107, and the robotic end effector 102 may be coupled to and in communication with a robotic arm. As shown in FIG. 1A, in an open position, the fingers 105 and nails 107 may be arranged around the suction cup 104 and opened or spread out radially from the suction cup 104 in order to release an item. As shown in FIG. 1B, in a closed position, the fingers 105 and nails 107 may be moved substantially radially inward toward the suction cup 104 in order to grasp and cage an item.

In example embodiments, the actuator 103 may comprise a pneumatic actuator that may provide suction, vacuum force, negative pressure, and/or positive pressure. When actuated, the actuator 103 may cause application of suction, vacuum, or negative pressure to the suction cup 104, such that the suction cup 104 may engage and/or lift a portion of an item. The suction cup 104 may be formed of various materials, such as silicone, rubber, plastics, composites, metals, or combinations thereof.

In additional example embodiments, the grasping fingers 105 may also be actuated by the actuator 103, e.g., a pneumatic actuator, or one or more other types of actuators. When actuated, the actuator 103 may cause application of positive pressure to the fingers 105 to cause movement or transition of the fingers 105 from the open position, as shown in FIG. 1A, to the closed position, as shown in FIG. 1B.

For example, the fingers 105 may be substantially hollow and in airflow communication with a pneumatic actuator, and radially outer portions of the fingers 105 may comprise baffles or other expandable sections, such that upon application of positive pressure to the hollow interior of the fingers 105, the baffles or other expandable sections may expand to move or transition the fingers 105 from the open position to the closed position. Upon removal of the applied positive pressure, elastic properties of the materials of the fingers 105 may cause movement or transition of the fingers 105 from the closed position back to the open position.

In a different example embodiment, the fingers 105 may be substantially hollow and in airflow communication with a pneumatic actuator, and radially outer portions of the fingers 105 may comprise baffles or other expandable sections, such that upon application of negative pressure to the hollow interior of the fingers 105, the baffles or other expandable sections may contract to move or transition the fingers 105 from the closed position to the open position. Upon removal of the applied negative pressure, elastic properties of the materials of the fingers 105 may cause movement or transition of the fingers 105 from the open position back to the closed position.

In various other example embodiments, baffles or other expandable sections may be provided at different portions of the fingers 105, and upon application of negative pressure and/or positive pressure, the fingers 105 may move or transition between open and closed positions based on the particular configuration of baffles or other expandable sections.

In other example embodiments, the actuator 103 may comprise various other types of actuators, such as a servo, a solenoid, a motor, or a shape memory alloy. For example, a servo, solenoid, or motor may be coupled to one or more portions of the fingers 105 to cause movement of the fingers 105 between the open and closed positions. In addition, a shape memory alloy may be coupled to one or more portions of the fingers 105, and/or may be integrally formed with one or more portions of the fingers 105. Upon application or removal of electrical current and/or heat, the shape memory alloy may cause movement of the fingers 105 between the open and closed positions.

The grasping fingers 105 may be formed of various materials, such as silicone, rubber, plastics, composites, metals, or combinations thereof. For example, the materials of various portions of the fingers 105 may provide flexibility and elasticity to facilitate movement or transition between the open and closed position. In addition, the materials of various portions of the fingers 105 may provide stiffness and friction to facilitate grasping of an item by the fingers 105.

In some example embodiments, various portions of the fingers may be formed of different materials, or different combinations of materials, to provide desired flexibility and elasticity at some portions, and to provide desired stiffness and friction at other portions. In additional example embodiments, various portions of the fingers may be formed of different thicknesses of materials, or different numbers of layers of materials, to provide desired flexibility and elasticity at some portions, and to provide desired stiffness and friction at other portions.

For example, portions of the fingers 105 that facilitate movement between the open and closed positions may generally be formed with desired flexibility and elasticity to enable actuation or movement. In addition, portions of the fingers 105 that facilitate grasping of an item may generally be formed with desired stiffness and friction to contact and grasp the item.

In further example embodiments, the fingers 105 may move between more than two positions, e.g., one or more additional positions other than the open and closed positions. Various of the actuators described herein may be used to cause movement or transition of the fingers 105 between a plurality of positions, including at least the open and closed positions.

The flexible nails 107 may be coupled to respective ends of the grasping fingers 105. The nails 107 may be formed of various materials, such as silicone, rubber, plastics, composites, metals, or combinations thereof. For example, the materials of various portions of the nails 107 may provide flexibility and elasticity to facilitate movement or sliding of the nails 107 in a first configuration that may generally correspond to the open position of the fingers 105. In addition, the materials of various portions of the nails 107 may provide stiffness and friction to facilitate grasping of an item by the nails 107 in a second configuration that may generally correspond to the closed position of the fingers 105. Further details of the flexible nails 107 are described herein at least with respect to FIG. 2.

Although FIGS. 1A and 1B illustrate a particular number, configuration, and arrangement of actuators, suction cups, fingers, and nails, other example embodiments may include other numbers, configurations, or arrangements of the various components or elements of the end effectors described herein. For example, a plurality of actuators may be included, a plurality of types of actuators may be included, a plurality of suction cups may be included, various numbers of fingers and associated nails may be included, some fingers may include nails, some fingers may not include nails, various fingers and nails may have different sizes, shapes, or dimensions, fingers and nails may be arranged or configured in various manners other than substantially radially around a suction cup, e.g., rows of opposing fingers and nails, or other configurations.

Figure 2:
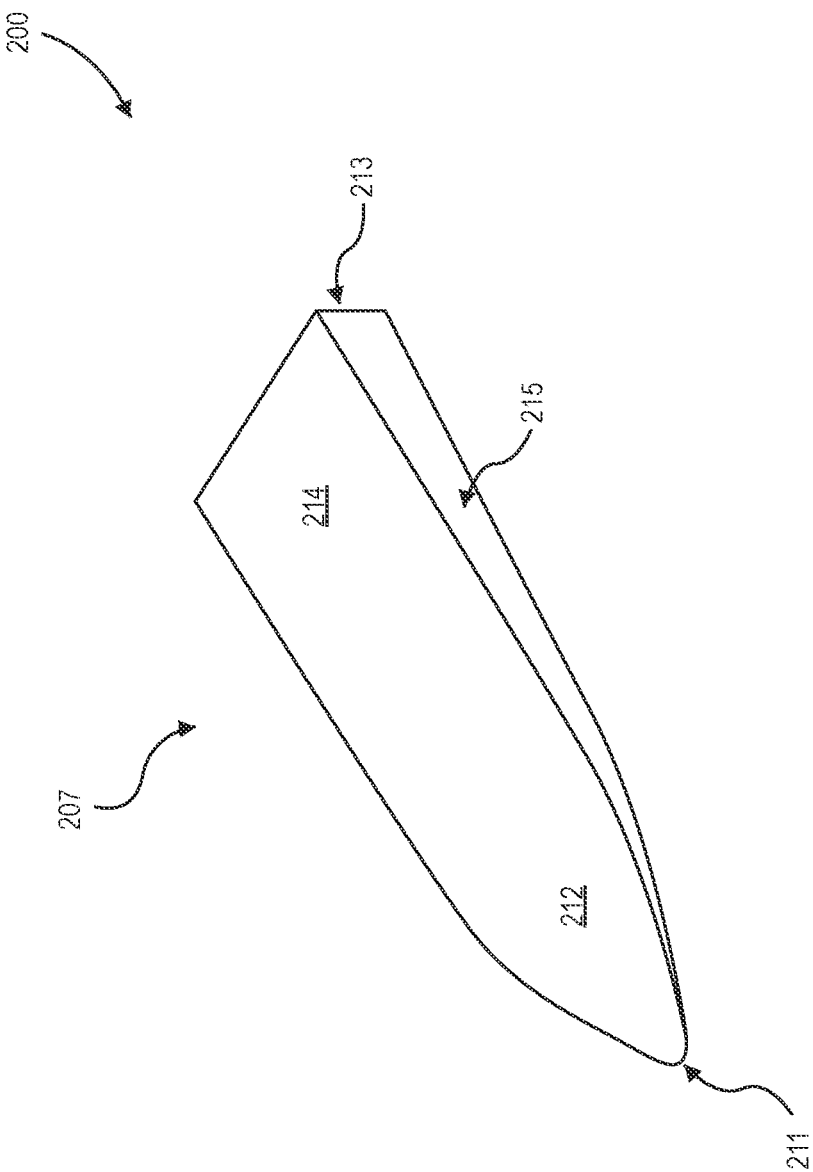
FIG. 2 is a schematic diagram of an example nail of a robotic end effector, in accordance with implementations of the present disclosure.

FIG. 2 is a schematic diagram 200 of an example nail of a robotic end effector, in accordance with implementations of the present disclosure.

The nails 207 may comprise a tip or end 211, upper and lower surfaces 212 proximate the tip or end 211, a portion 213 that couples to a respective finger, upper and lower surfaces 214 proximate the portion 213, and/or one or more side surfaces 215. Various of the flexible nails described herein may include any and all of the features of example nails described herein with respect to FIG. 2.

In some example embodiments, various portions of the nails 207 may be formed of different materials, or different combinations of materials, to provide desired flexibility and elasticity at some portions, and to provide desired stiffness and friction at other portions. In additional example embodiments, various portions of the nails may be formed of different thicknesses of materials, or different numbers of layers of materials, to provide desired flexibility and elasticity at some portions, and to provide desired stiffness and friction at other portions.

For example, portions of the nails 207, e.g., the tip 211 and/or the surfaces 212 proximate the tip 211, that facilitate movement or sliding of the nails 207 may generally be formed with desired flexibility and elasticity to enable bending, flexing, movement, or sliding. In addition, portions of the nails 207, e.g., the portion 213 that couples to a respective finger and/or the surfaces 214 proximate the portion 213, that facilitate grasping of an item may generally be formed with desired stiffness and friction to contact and grasp the item.

One example embodiment of the nails 207 may comprise a titanium sheet having various layers of plastic or acrylic material applied thereto. For example, at one end of the titanium sheet that corresponds to a tip or end 211 of the nail 207, one layer of plastic material may be applied, e.g., to surfaces 212, to provide high flexibility and low friction. Moving toward an opposite end of the titanium sheet that corresponds to a portion 213 of the nail 207 that is coupled to a respective finger, additional layers of plastic material may be incrementally applied, e.g., to portions of surfaces 212 and 214, in order to gradually provide lower flexibility and higher friction.

In example embodiments, the nails 207 may be formed with variable flexibility along respective lengths of the nails 207. For example, tips or ends 211 and surfaces 212 of the nails 207 may have greater flexibility to enable bending, flexing, movement, or sliding, and portions 213 and surfaces 214 of the nails 207 adjacent or coupled to respective fingers may have lower flexibility to enable grasping or caging of an item.

In further example embodiments, the nails 207 may be formed with variable friction along respective lengths of the nails 207. For example, tips or ends 211 and surfaces 212 of the nails 207 may have lower friction to enable bending, flexing, movement, or sliding, and portions 213 and surfaces 214 of the nails 207 adjacent or coupled to respective fingers may have higher friction to enable grasping or caging of an item.

The nails 207 may facilitate sliding under, around, or relative to various portions of an item in order to more reliably grasp and cage an item, e.g., a base, sides, top, or other surfaces or portions of the item. In addition, the nails 207 may facilitate sliding relative to one or more support surfaces from which the item is to be grasped, e.g., a tabletop, workstation surface, conveyor belt, base of a container or tray, walls of a container or tray, other environment surfaces, or various other support surfaces. Further, the nails 207 may facilitate sliding relative to one or more other items proximate the item to be grasped, e.g., one or more other items on a tabletop, on a workstation surface, on a conveyor belt, within a container or tray, or adjacent, below, or above the item.

In addition, the nails 107, 207 may facilitate grasping or caging an item by contacting or gripping one or more portions of the item, potentially in addition to grasping by one or more fingers 105 and/or engagement by one or more suction cups 104. For example, the nails 107, 207 may facilitate caging of the item within the fingers 105 and nails 107, 207 and proximate the suction cup 104, so that the item may be more securely and reliably grasped and thereby reduce potential damage to the item during grasping and movement.

In various other example embodiments, portions of the nails 207 may be formed of materials having directional friction properties. For example, movement or sliding of such a nail 207 in a first direction relative to an item may result in low friction to thereby enable sliding of the nail 207 relative to the item, but movement or sliding of the nail 207 in a second, opposite direction relative to the item may result in high friction to thereby enable grasping of the item by the nail 207.

In alternative example embodiments, the nails 207 may also include actuators to cause movement or transition of the nails 207 between two or more configurations, such as pneumatic actuators, servos, solenoids, motors, shape memory alloys, or combinations thereof. For example, one or more nails 207 may be extendible, retractable, bendable, or flexible relative to respective fingers 105 to which they are coupled. In some example embodiments, the nails 207 may be actuated in similar manner to actuation of the fingers 105 as described herein, e.g., between a sliding configuration of the nails 207 that generally corresponds to the open position of the fingers 105, and a grasping or caging configuration of the nails 207 that generally corresponds to the closed position of the fingers 105. Various other example embodiments of nails having actuators to transition between two or more configurations are described herein at least with respect to FIGS. 5A-7B.

Although FIG. 2 illustrates a particular size, shape, dimensions, configuration, and arrangement of portions of an example nail, other example embodiments may include other sizes, shapes, dimensions, configurations, or arrangements of the various portions of an example nail of the end effectors described herein. For example, other example nails may have a triangular, rectangular, square, oval, oblong, fork, or other shape, may have various other surfaces, edges, or corners, may be formed of various different materials, different numbers of layers of materials, and/or different thicknesses of materials, may include various protrusions, bumps, ridges, grooves, dimples, or other surface features, etc.

As shown in FIGS. 1A and 1B, the robotic end effectors described herein may include various combinations of suction cups, fingers, and nails to engage, grasp, and cage an item. Other example embodiments of robotic end effectors may include combinations of fingers and nails, without suction cups, to grasp and cage an item. Further example embodiments of robotic end effectors may include combinations of fingers and nails having different sizes, shapes, or dimensions to grasp and cage an item. Still further example embodiments of robotic end effectors may include flexible nails that are coupled to rigid fingers, e.g., formed of plastic, metal, composite, or other materials, in which the rigid fingers may be actuated to move between two or more positions, and the flexible nails may move between two or more configurations corresponding to movements of the fingers.

FIGS. 3A-3C are schematic diagrams 300A-300C of an example item grasping process using a robotic end effector having fingers and nails, in accordance with implementations of the present disclosure.

In order to grasp an item using the robotic end effectors described herein, an imaging device may capture imaging data of an item to be grasped. For example, the imaging device may comprise a camera, imaging sensor, or various other types of imaging devices. The imaging data may include a representation of the item, as well as representations of one or more other items and/or portions of an environment or container around the item. The imaging data may be processed using various types of image recognition techniques or algorithms, e.g., edge detection, surface detection, feature detection, object detection, machine learning, and/or various other types of image recognition or computer vision techniques or algorithms.

Based on the processed imaging data, various attributes or characteristics of an item may be determined. For example, an item type, identity, shape, size, dimensions, weight, volume, pose including position and/or orientation, packaging material, packaging attributes including seams, corners, edges, hinges, flaps, covers, lids, or others, position and/or orientation relative to one or more other items in proximity, position and/or orientation relative to portions of an environment or container, and/or various other attributes or characteristics of items.

In the example of FIGS. 3A-3C, imaging data of the item 320 may be processed to determine that the item 320 is a hardcover book having a spine or binding, with particular shape, size, dimensions, weight, and/or volume, and that is resting on a support surface 325 at a particular position and/or orientation.

In addition, as further described herein, one or more grasp points, one or more approach trajectories, one or more grasp characteristics, and/or one or more movement characteristics may also be determined based on the processed imaging data and/or various attributes or characteristics of an item. The determined attributes of an item, grasp points, approach trajectories, grasp characteristics, and/or movement characteristics may comprise portions of an item grasp strategy for the item.

For example, one or more grasp points at which to grasp and cage the item may be determined based on the processed imaging data and/or various attributes or characteristics of an item. The grasp points may be determined based on item type, identity, shape, size, dimensions, weight, volume, pose, packaging material, packaging attributes, position and/or orientation relative to one or more other items in proximity, position and/or orientation relative to portions of an environment or container, and/or various other attributes or characteristics. For books, magazines, or similar items, the grasp points may include portions, surfaces, or edges along spines or bindings of the items. For boxes or containers with openable lids or covers, the grasp points may include seams or interfaces between covers and other static portions of the containers. For items in flexible or plastic packaging, the grasp points may include corners, edges, or seams of the flexible packaging. Various other grasp points may be determined and used to grasp various types of items.

In addition, various portions, surfaces, or other features of items may be determined as undesirable grasp points based on the processed imaging data and/or various attributes or characteristics of an item. For example, front or back surfaces of books or magazines, bottom surfaces of containers or boxes with covers or lids, surfaces associated with openable lids or covers, large and/or smooth surfaces of flexible packaging, portions of perforated, releasable, or detachable packaging, and/or various other portions, surfaces, or features of items may be determined as undesirable grasp points.

In the example of FIGS. 3A-3C, one or more grasp points associated with the spine or binding of the item 320 may be identified. In addition, one or more undesirable grasp points associated with the front surface of the item 320 and/or other side surfaces of the item 320 other than the spine or binding may also be identified.

Further, one or more approach trajectories by which to move or advance toward the item to grasp may also be determined based on the processed imaging data and/or various attributes or characteristics of an item. For example, the approach trajectories may include particular positions and/or orientations of a robotic end effector to move toward and initiate grasping of an object. The approach trajectories may be determined based on item type, identity, shape, size, dimensions, weight, volume, pose, packaging material, packaging attributes, position and/or orientation relative to one or more other items in proximity, position and/or orientation relative to portions of an environment or container, and/or various other attributes or characteristics, as well as one or more determined grasp points. Example approach trajectories may also include various types of grasping techniques, such as picking, scooping, sliding, pushing, turning, re-orienting, and/or other techniques or movements. Various types of techniques or algorithms may be used to determine the approach trajectories, such as motion planning optimization algorithms, dense robot streaming motion interfaces, heuristics, machine learning algorithms, and/or various other techniques or algorithms.

In the example of FIGS. 3A-3C, an approach trajectory to grasp the item 320 may include moving toward the item 320 from a position and orientation substantially vertically above the item 320, and picking the item 320 from the support surface 325. FIG. 3A shows an initial approach by the robotic end effector 302 toward the item 320 on the support surface 325. The suction cup 304 may be actuated to engage the item 320, e.g., at or proximate a determined grasp point. In addition, the grasping fingers 305 may be positioned in an open position, and the flexible nails 307 may be positioned or oriented in a flexible, sliding configuration during the approach.

Moreover, one or more grasp characteristics by which to grasp and cage the item may also be determined based on the processed imaging data and/or various attributes or characteristics of an item. For example, the grasp characteristics may include grasping sequences, suction forces, item adjustments or movements, grasping forces, scooping or sliding forces, other forces or operations, or other grasp characteristics of the item. The grasp characteristics may be determined based on item type, identity, shape, size, dimensions, weight, volume, pose, packaging material, packaging attributes, position and/or orientation relative to one or more other items in proximity, position and/or orientation relative to portions of an environment or container, and/or various other attributes or characteristics, as well as one or more determined grasp points and/or approach trajectories. Example grasp characteristics may include suction forces to engage the item with a suction cup, movements or adjustments by a robotic arm to move, re-orient, re-image, or singulate the item, grasping or pinching forces exerted by grasping fingers and/or nails, sequences of suction, grasping, caging, picking, sliding, scooping, adjusting, or various other operations, and/or various other grasp characteristics.

In the example of FIGS. 3A-3C, the grasp characteristics may include particular suction forces and grasping forces, as well as a grasp sequence including initial engagement using suction, partial lifting of the item, sliding or inserting nails relative to the item and/or support surface, and picking the item substantially vertically from the support surface. FIG. 3B shows initial engagement of the item 320 by the suction cup 304, partial lifting of the item 320 by the suction cup 304 and/or movement of the robotic arm, insertion of some of the nails 307 between the item 320 and the support surface 325, movement of the fingers 305 to a closed position, and corresponding movement of the nails 307 to a grasping configuration. In addition, the suction cup 304 may engage the item 320 with defined suction forces, and the fingers 305 and/or nails 307 may grasp or cage the item 320 with defined grasping forces.

Furthermore, one or more movement characteristics by which to move or transfer the grasped and caged item may also be determined based on the processed imaging data and/or various attributes or characteristics of an item. For example, the movement characteristics may include movement types, movement sequences, directions, speeds, accelerations, or other movement characteristics of the item. The movement characteristics may be determined based on item type, identity, shape, size, dimensions, weight, volume, pose, packaging material, packaging attributes, position and/or orientation relative to one or more other items in proximity, position and/or orientation relative to portions of an environment or container, and/or various other attributes or characteristics, as well as one or more determined grasp points, approach trajectories, and/or grasp characteristics. Example movement characteristics may include vertical or horizontal translation, rotational movements, sliding, pushing, pulling, or dragging movements, various speeds, various accelerations, combinations or sequences of different movements, and/or various other movement characteristics.

In the example of FIGS. 3A-3C, the movement characteristics may include particular movement types, movement sequences, directions, speeds, or accelerations to pick and transfer the item substantially vertically from the support surface. FIG. 3C shows substantially vertical picking movement of the item 320 from the support surface 325, in which the item is engaged by the suction cup 304 with defined suction forces and grasped or caged by the fingers 305 and/or nails 307 with defined grasping forces. The vertical picking movement may be performed with defined movements, directions, speeds, or accelerations based at least in part on the suction forces and/or grasping forces applied to the item 320 to ensure safe and reliable movement of the item 320, while avoiding or preventing opening, stretching, ripping, tearing, dropping, or otherwise damaging the item during grasping and movement.

Although FIGS. 3A-3C illustrate a particular item grasp strategy for an item, other example embodiments may include various other aspects, elements, combinations, or sequences of an item grasp strategy. For example, various other grasp points may be determined or identified, various other approach trajectories may be determined and utilized, various other grasp characteristics may be determined and implemented such as different operations, sequences, and/or forces, and/or various other movement characteristics may be determined and performed such as different movements, sequences, speeds, and/or accelerations.

In additional example embodiments, an item may be initially grasped and caged by fingers and/or nails and then subsequently engaged by a suction cup. In other example embodiments, an item may be partially lifted or separated from a support surface by suction forces, by movements of a robotic arm, and/or by insertion of fingers and/or nails between the item and the support surface. In further example embodiments, an item grasp strategy may include only grasping and caging of the item by fingers and/or nails, without any engagement of the item by a suction cup. In yet other example embodiments, an item grasp strategy may include a plurality of mechanical grippers, pinchers, or graspers, in which a first set of mechanical grippers may engage and/or lift a portion of an item, and a second set of mechanical grippers, e.g., fingers and/or nails, may grasp and/or cage the item.

FIGS. 4A-4C are schematic diagrams 400A-400C of another example item grasping process using a robotic end effector having fingers and nails, in accordance with implementations of the present disclosure. The example item grasping process of FIGS. 4A-4C may include any and all of the features described herein at least with respect to FIGS. 3A-3C.

In order to grasp an item using the robotic end effectors described herein, an imaging device may capture imaging data of an item to be grasped. The imaging data may include a representation of the item, as well as representations of one or more other items and/or portions of an environment or container around the item. The imaging data may be processed using various types of image recognition techniques or algorithms, e.g., edge detection, surface detection, feature detection, object detection, machine learning, and/or various other types of image recognition or computer vision techniques or algorithms.

Based on the processed imaging data, various attributes or characteristics of an item may be determined. For example, an item type, identity, shape, size, dimensions, weight, volume, pose including position and/or orientation, packaging material, packaging attributes including seams, corners, edges, hinges, flaps, covers, lids, or others, position and/or orientation relative to one or more other items in proximity, position and/or orientation relative to portions of an environment or container, and/or various other attributes or characteristics of items.

In the example of FIGS. 4A-4C, imaging data of the item 420 may be processed to determine that the item 420 is a hardcover book having a spine or binding, with particular shape, size, dimensions, weight, and/or volume, and that is resting on a support surface 425 at a particular position and/or orientation.

In addition, as further described herein, one or more grasp points, one or more approach trajectories, one or more grasp characteristics, and/or one or more movement characteristics may also be determined based on the processed imaging data and/or various attributes or characteristics of an item. The determined attributes of an item, grasp points, approach trajectories, grasp characteristics, and/or movement characteristics may comprise portions of an item grasp strategy for the item.

For example, one or more grasp points at which to grasp and cage the item may be determined based on the processed imaging data and/or various attributes or characteristics of an item. The grasp points may be determined based on item type, identity, shape, size, dimensions, weight, volume, pose, packaging material, packaging attributes, position and/or orientation relative to one or more other items in proximity, position and/or orientation relative to portions of an environment or container, and/or various other attributes or characteristics.

In the example of FIGS. 4A-4C, one or more grasp points associated with the spine or binding of the item 420 may be identified. In addition, one or more undesirable grasp points associated with the front surface of the item 420 and/or other side surfaces of the item 420 other than the spine or binding may also be identified.

Further, one or more approach trajectories by which to move or advance toward the item to grasp may also be determined based on the processed imaging data and/or various attributes or characteristics of an item. For example, the approach trajectories may include particular positions and/or orientations of a robotic end effector to move toward and initiate grasping of an object. The approach trajectories may be determined based on item type, identity, shape, size, dimensions, weight, volume, pose, packaging material, packaging attributes, position and/or orientation relative to one or more other items in proximity, position and/or orientation relative to portions of an environment or container, and/or various other attributes or characteristics, as well as one or more determined grasp points. Example approach trajectories may also include various types of grasping techniques, such as picking, scooping, sliding, pushing, turning, re-orienting, and/or other techniques or movements. Various types of techniques or algorithms may be used to determine the approach trajectories, such as motion planning optimization algorithms, dense robot streaming motion interfaces, heuristics, machine learning algorithms, and/or various other techniques or algorithms.

In the example of FIGS. 4A-4C, an approach trajectory to grasp the item 420 may include moving toward the item 420 from a position and orientation at an angle from a side and slightly above the item 420, and scooping, pushing, or lifting the item 420 from the support surface 425. FIG. 4A shows an initial approach by the robotic end effector 402 toward the item 420 on the support surface 425. The suction cup 404 may be actuated to engage the item 420, e.g., at or proximate a determined grasp point. In addition, the grasping fingers 405 may be positioned in an open position, and the flexible nails 407 may be positioned or oriented in a flexible, sliding configuration during the approach. Further, some of the nails 407 may be positioned along the support surface 425 to at least partially slide under the item 420 to scoop, push, or lift the item 420 from the support surface 425.

Moreover, one or more grasp characteristics by which to grasp and cage the item may also be determined based on the processed imaging data and/or various attributes or characteristics of an item. For example, the grasp characteristics may include grasping sequences, suction forces, item adjustments or movements, grasping forces, scooping or sliding forces, other forces or operations, or other grasp characteristics of the item. The grasp characteristics may be determined based on item type, identity, shape, size, dimensions, weight, volume, pose, packaging material, packaging attributes, position and/or orientation relative to one or more other items in proximity, position and/or orientation relative to portions of an environment or container, and/or various other attributes or characteristics, as well as one or more determined grasp points and/or approach trajectories. Example grasp characteristics may include suction forces to engage the item with a suction cup, movements or adjustments by a robotic arm to move, re-orient, re-image, or singulate the item, grasping or pinching forces exerted by grasping fingers and/or nails, sequences of suction, grasping, caging, picking, sliding, scooping, adjusting, or various other operations, and/or various other grasp characteristics.

In the example of FIGS. 4A-4C, the grasp characteristics may include particular suction forces and grasping forces, as well as a grasp sequence including initial engagement using suction, sliding or inserting nails relative to the item and/or support surface, partial lifting of the item, and scooping or lifting the item away from the support surface. FIG. 4B shows initial engagement of the item 420 by the suction cup 404, pushing or sliding of some of the fingers 405 and/or nails 407 between the item 420 and the support surface 425, partial lifting of the item 420 by the suction cup 404, the fingers 405 and/or nails 407, and/or movement of the robotic arm, movement of the fingers 405 to a closed position, and corresponding movement of the nails 407 to a grasping configuration. In addition, the suction cup 404 may engage the item 420 with defined suction forces, and the fingers 405 and/or nails 407 may grasp or cage the item 420 with defined grasping forces.

Furthermore, one or more movement characteristics by which to move or transfer the grasped and caged item may also be determined based on the processed imaging data and/or various attributes or characteristics of an item. For example, the movement characteristics may include movement types, movement sequences, directions, speeds, accelerations, or other movement characteristics of the item. The movement characteristics may be determined based on item type, identity, shape, size, dimensions, weight, volume, pose, packaging material, packaging attributes, position and/or orientation relative to one or more other items in proximity, position and/or orientation relative to portions of an environment or container, and/or various other attributes or characteristics, as well as one or more determined grasp points, approach trajectories, and/or grasp characteristics. Example movement characteristics may include vertical or horizontal translation, rotational movements, sliding, pushing, pulling, or dragging movements, various speeds, various accelerations, combinations or sequences of different movements, and/or various other movement characteristics.

In the example of FIGS. 4A-4C, the movement characteristics may include particular movement types, movement sequences, directions, speeds, or accelerations to scoop, lift, and transfer the item away from the support surface. FIG. 4C shows a lifting movement of the item 420 from the support surface 425 after initial scooping, pushing, and/or dragging, in which the item is engaged by the suction cup 404 with defined suction forces and grasped or caged by the fingers 405 and/or nails 407 with defined grasping forces. The scooping and lifting movement may be performed with defined movements, directions, speeds, or accelerations based at least in part on the suction forces and/or grasping forces applied to the item 420 to ensure safe and reliable movement of the item 420, while avoiding or preventing opening, stretching, ripping, tearing, dropping, or otherwise damaging the item during grasping and movement.

Although FIGS. 4A-4C illustrate a particular item grasp strategy for an item, other example embodiments may include various other aspects, elements, combinations, or sequences of an item grasp strategy. For example, various other grasp points may be determined or identified, various other approach trajectories may be determined and utilized, various other grasp characteristics may be determined and implemented such as different operations, sequences, and/or forces, and/or various other movement characteristics may be determined and performed such as different movements, sequences, speeds, and/or accelerations.

In additional example embodiments, an item may be initially grasped and caged by fingers and/or nails and then subsequently engaged by a suction cup. In other example embodiments, an item may be partially lifted or separated from a support surface by suction forces, by movements of a robotic arm, and/or by insertion of fingers and/or nails between the item and the support surface. In further example embodiments, an item grasp strategy may include only grasping and caging of the item by fingers and/or nails, without any engagement of the item by a suction cup. In yet other example embodiments, an item grasp strategy may include a plurality of mechanical grippers, pinchers, or graspers, in which a first set of mechanical grippers may engage and/or lift a portion of an item, and a second set of mechanical grippers, e.g., fingers and/or nails, may grasp and/or cage the item.

FIGS. 5A and 5B are schematic diagrams 500A, 500B of an example nail of a robotic end effector in a first configuration and a second configuration, respectively, in accordance with implementations of the present disclosure.

The nails 507 may comprise a tip or end 511, a portion 513 that couples to a respective finger, upper and lower surfaces proximate the tip or end 511 and proximate the portion 513, and/or one or more side or edge surfaces 515. In addition, the nails 507 may include a crease, fold, hinge, living hinge, or other similar structure 517 that extends along a length of the nails 507, and an actuator 519 associated with the crease or fold 517. Various of the flexible nails described herein may include any and all of the features of example nails described herein with respect to FIGS. 5A and 5B.

In some example embodiments, various portions of the nails 507 may be formed of different materials, or different combinations of materials, to provide desired flexibility and elasticity at some portions, and to provide desired stiffness and friction at other portions. In additional example embodiments, various portions of the nails may be formed of different thicknesses of materials, or different numbers of layers of materials, to provide desired flexibility and elasticity at some portions, and to provide desired stiffness and friction at other portions.

For example, portions of the nails 507, e.g., the tip 511 and associated surfaces, that facilitate movement or sliding of the nails 507 may generally be formed with desired flexibility and elasticity to enable bending, flexing, movement, or sliding. In addition, portions of the nails 507, e.g., the portion 513 that couples to a respective finger and associated surfaces, that facilitate grasping of an item may generally be formed with desired stiffness and friction to contact and grasp the item.

In example embodiments, the nails 507 may be formed with variable flexibility along respective lengths of the nails 507. For example, tips or ends 511 and associated surfaces of the nails 507 may have greater flexibility to enable bending, flexing, movement, or sliding, and portions 513 and associated surfaces of the nails 507 adjacent or coupled to respective fingers may have lower flexibility to enable grasping or caging of an item.

In further example embodiments, the nails 507 may be formed with variable friction along respective lengths of the nails 507. For example, tips or ends 511 and associated surfaces of the nails 507 may have lower friction to enable bending, flexing, movement, or sliding, and portions 513 and associated surfaces of the nails 507 adjacent or coupled to respective fingers may have higher friction to enable grasping or caging of an item.

The nails 507 may facilitate sliding under, around, or relative to various portions of an item in order to more reliably grasp and cage an item, e.g., a base, sides, top, or other surfaces or portions of the item. In addition, the nails 507 may facilitate sliding relative to one or more support surfaces from which the item is to be grasped, e.g., a tabletop, workstation surface, conveyor belt, base of a container or tray, walls of a container or tray, other environment surfaces, or various other support surfaces. Further, the nails 507 may facilitate sliding relative to one or more other items proximate the item to be grasped, e.g., one or more other items on a tabletop, on a workstation surface, on a conveyor belt, within a container or tray, or adjacent, below, or above the item.

In the example of FIGS. 5A and 5B, upper and lower surfaces of the nails 507 may be formed with materials having high flexibility and low friction properties. In the first, sliding configuration as shown in FIG. 5A, the actuator 519 may maintain the nails 507 in an unfolded configuration, such that the nails 507 are substantially flat or planar. In this manner, in the first, sliding configuration as shown in FIG. 5A, the nails 507 may substantially bend, flex, and slide along portions of items and/or portions of an environment or container in order to grasp and cage an item using the fingers and/or nails 507.

In addition, the nails 507 may facilitate grasping or caging an item by contacting or gripping one or more portions of the item, potentially in addition to grasping by one or more fingers and/or engagement by one or more suction cups. For example, the nails 507 may facilitate caging of the item within the fingers and nails 507 and proximate the suction cup, so that the item may be more securely and reliably grasped and thereby reduce potential damage to the item during grasping and movement.

In the example of FIGS. 5A and 5B, side or edge surfaces 515 of the nails 507 may be formed with materials having high friction properties. In the second, grasping configuration as shown in FIG. 5B, the actuator 519 may actuate or fold the nails 507 along the crease or fold 517 to a folded configuration such that the nails 507 have lower flexibility. In this manner, in a second, grasping configuration as shown in FIG. 5B, the side surfaces 515 of the nails 507 may substantially grasp portions of an item in order to grasp and cage the item using the fingers and/or nails 507. Further, the folded configuration of the nails 507 may also lift or separate portions of the item from one or more support surfaces during an item grasping process.

The actuators 519 to actuate or fold the nails 507 between two or more configurations, e.g., the unfolded and folded configurations, may include pneumatic actuators, servos, solenoids, motors, shape memory alloys, or combinations thereof. In example embodiments, actuation of the nails 507 may occur separately from or substantially simultaneously with actuation of the fingers as described herein, e.g., movements of the fingers between the open and closed positions.

Although FIGS. 5A and 5B illustrate a particular size, shape, dimensions, configuration, and arrangement of portions of an example nail, other example embodiments may include other sizes, shapes, dimensions, configurations, or arrangements of the various portions of an example nail of the end effectors described herein. For example, other example nails may have a triangular, rectangular, square, oval, oblong, fork, or other shape, may have various other surfaces, edges, or corners, may be formed of various different materials, different numbers of layers of materials, and/or different thicknesses of materials, may include various protrusions, bumps, ridges, grooves, dimples, or other surface features, etc.

FIGS. 6A and 6B are schematic diagrams 600A, 600B of another example nail of a robotic end effector in a first configuration and a second configuration, respectively, in accordance with implementations of the present disclosure.

The nails 607 may comprise a tip or end 611, a portion 613 that couples to a respective finger, upper and lower surfaces proximate the tip or end 611 and proximate the portion 613, and/or one or more side or edge surfaces. In addition, the nails 607 may include an orifice or passage 621 within which a stiffening rod, beam, pole, or similar structure 623 may be extended or retracted along a length of the nails 607, and an actuator 619 associated with the stiffening rod 623. Various of the flexible nails described herein may include any and all of the features of example nails described herein with respect to FIGS. 6A and 6B.

In some example embodiments, various portions of the nails 607 may be formed of different materials, or different combinations of materials, to provide desired flexibility and elasticity at some portions, and to provide desired stiffness and friction at other portions. In additional example embodiments, various portions of the nails may be formed of different thicknesses of materials, or different numbers of layers of materials, to provide desired flexibility and elasticity at some portions, and to provide desired stiffness and friction at other portions.

For example, portions of the nails 607, e.g., the tip 611 and associated surfaces, that facilitate movement or sliding of the nails 607 may generally be formed with desired flexibility and elasticity to enable bending, flexing, movement, or sliding. In addition, portions of the nails 607, e.g., the portion 613 that couples to a respective finger and associated surfaces, that facilitate grasping of an item may generally be formed with desired stiffness and friction to contact and grasp the item.

In example embodiments, the nails 607 may be formed with variable flexibility along respective lengths of the nails 607. For example, tips or ends 611 and associated surfaces of the nails 607 may have greater flexibility to enable bending, flexing, movement, or sliding, and portions 613 and associated surfaces of the nails 607 adjacent or coupled to respective fingers may have lower flexibility to enable grasping or caging of an item.

In further example embodiments, the nails 607 may be formed with variable friction along respective lengths of the nails 607. For example, tips or ends 611 and associated surfaces of the nails 607 may have lower friction to enable bending, flexing, movement, or sliding, and portions 613 and associated surfaces of the nails 607 adjacent or coupled to respective fingers may have higher friction to enable grasping or caging of an item.

The nails 607 may facilitate sliding under, around, or relative to various portions of an item in order to more reliably grasp and cage an item, e.g., a base, sides, top, or other surfaces or portions of the item. In addition, the nails 607 may facilitate sliding relative to one or more support surfaces from which the item is to be grasped, e.g., a tabletop, workstation surface, conveyor belt, base of a container or tray, walls of a container or tray, other environment surfaces, or various other support surfaces. Further, the nails 607 may facilitate sliding relative to one or more other items proximate the item to be grasped, e.g., one or more other items on a tabletop, on a workstation surface, on a conveyor belt, within a container or tray, or adjacent, below, or above the item.

In the example of FIGS. 6A and 6B, upper and lower surfaces of the nails 607 may be formed with variable flexibility and/or variable friction as described herein. In the first, sliding configuration as shown in FIG. 6A, the actuator 619 may retract the stiffening rod 623 from the passage 621 such that the nails 607 exhibit higher flexibility and/or lower friction in this retracted configuration. In this manner, in the first, sliding configuration as shown in FIG. 6A, the nails 607 may substantially bend, flex, and slide along portions of items and/or portions of an environment or container in order to grasp and cage an item using the fingers and/or nails 607.

In addition, the nails 607 may facilitate grasping or caging an item by contacting or gripping one or more portions of the item, potentially in addition to grasping by one or more fingers and/or engagement by one or more suction cups. For example, the nails 607 may facilitate caging of the item within the fingers and nails 607 and proximate the suction cup, so that the item may be more securely and reliably grasped and thereby reduce potential damage to the item during grasping and movement.

In the example of FIGS. 6A and 6B, in the second, grasping configuration as shown in FIG. 6B, the actuator 619 may extend the stiffening rod 623 into the passage 621 such that the nails 607 exhibit lower flexibility and/or higher friction in this extended configuration. In this manner, in a second, grasping configuration as shown in FIG. 6B, the nails 607 may substantially grasp portions of an item in order to grasp and cage the item using the fingers and/or nails 607.

The stiffening rod 623 may be formed of various materials, such as silicone, rubber, plastics, composites, metals, or combinations thereof. In addition, the stiffening rod 623 may also have variable stiffness along its length, e.g., lower stiffness toward an end that is inserted proximate the tip 611 of the nails 607 and higher stiffness toward an end that is proximate the portion 613 of the nails 607. The actuators 619 to extend or retract the stiffening rod 623 relative to the passage 621 to adjust or transition the nails 607 between two or more configurations, e.g., the retracted and extended configurations, may include pneumatic actuators, servos, solenoids, motors, shape memory alloys, or combinations thereof. In example embodiments, actuation or adjustment of the nails 607 may occur separately from or substantially simultaneously with actuation of the fingers as described herein, e.g., movements of the fingers between the open and closed positions.

Although FIGS. 6A and 6B illustrate a particular size, shape, dimensions, configuration, and arrangement of portions of an example nail, other example embodiments may include other sizes, shapes, dimensions, configurations, or arrangements of the various portions of an example nail of the end effectors described herein. For example, other example nails may have a triangular, rectangular, square, oval, oblong, fork, or other shape, may have various other surfaces, edges, or corners, may be formed of various different materials, different numbers of layers of materials, and/or different thicknesses of materials, may include various protrusions, bumps, ridges, grooves, dimples, or other surface features, etc.

Figures 7A, 7B:
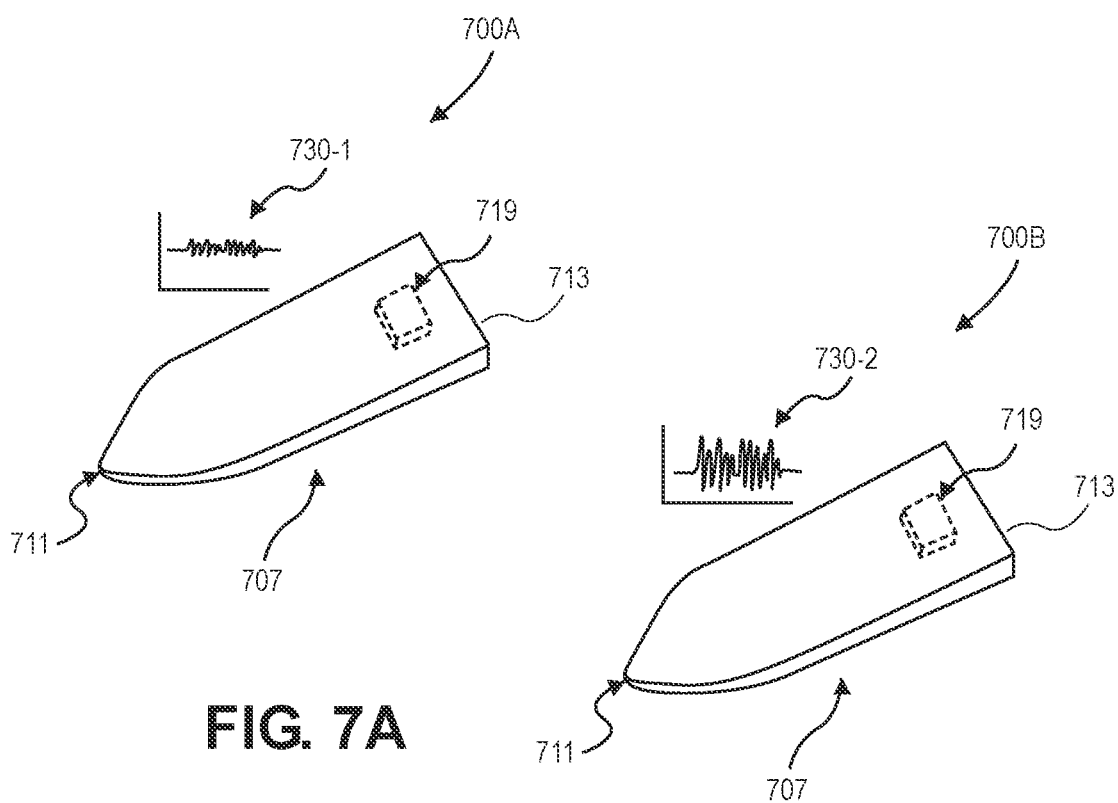
FIGS. 7A and 7B are schematic diagrams of a further example nail of a robotic end effector in a first configuration and a second configuration, respectively, in accordance with implementations of the present disclosure.

FIGS. 7A and 7B are schematic diagrams 700A, 700B of a further example nail of a robotic end effector in a first configuration and a second configuration, respectively, in accordance with implementations of the present disclosure.

The nails 707 may comprise a tip or end 711, a portion 713 that couples to a respective finger, upper and lower surfaces proximate the tip or end 711 and proximate the portion 713, and/or one or more side or edge surfaces. In addition, the nails 707 may include an actuator 719 that is configured to induce or cause vibration of the nails 707. Various of the flexible nails described herein may include any and all of the features of example nails described herein with respect to FIGS. 7A and 7B.

In some example embodiments, various portions of the nails 707 may be formed of different materials, or different combinations of materials, to provide desired flexibility and elasticity at some portions, and to provide desired stiffness and friction at other portions. In additional example embodiments, various portions of the nails may be formed of different thicknesses of materials, or different numbers of layers of materials, to provide desired flexibility and elasticity at some portions, and to provide desired stiffness and friction at other portions.

For example, portions of the nails 707, e.g., the tip 711 and associated surfaces, that facilitate movement or sliding of the nails 707 may generally be formed with desired flexibility and elasticity to enable bending, flexing, movement, or sliding. In addition, portions of the nails 707, e.g., the portion 713 that couples to a respective finger and associated surfaces, that facilitate grasping of an item may generally be formed with desired stiffness and friction to contact and grasp the item.

In example embodiments, the nails 707 may be formed with variable flexibility along respective lengths of the nails 707. For example, tips or ends 711 and associated surfaces of the nails 707 may have greater flexibility to enable bending, flexing, movement, or sliding, and portions 713 and associated surfaces of the nails 707 adjacent or coupled to respective fingers may have lower flexibility to enable grasping or caging of an item.

In further example embodiments, the nails 707 may be formed with variable friction along respective lengths of the nails 707. For example, tips or ends 711 and associated surfaces of the nails 707 may have lower friction to enable bending, flexing, movement, or sliding, and portions 713 and associated surfaces of the nails 707 adjacent or coupled to respective fingers may have higher friction to enable grasping or caging of an item.

The nails 707 may facilitate sliding under, around, or relative to various portions of an item in order to more reliably grasp and cage an item, e.g., a base, sides, top, or other surfaces or portions of the item. In addition, the nails 707 may facilitate sliding relative to one or more support surfaces from which the item is to be grasped, e.g., a tabletop, workstation surface, conveyor belt, base of a container or tray, walls of a container or tray, other environment surfaces, or various other support surfaces. Further, the nails 707 may facilitate sliding relative to one or more other items proximate the item to be grasped, e.g., one or more other items on a tabletop, on a workstation surface, on a conveyor belt, within a container or tray, or adjacent, below, or above the item.

In the example of FIGS. 7A and 7B, upper and lower surfaces of the nails 707 may be formed with variable flexibility and/or variable friction as described herein. In the first, sliding configuration as shown in FIG. 7A, the actuator 719 may induce or cause vibration of the nails 707 according to a first, emitted vibration profile 730-1 such that the nails 707 exhibit higher flexibility and/or lower friction in this first configuration. For example, various different vibration profiles may cause various types of materials to exhibit lower friction properties. In this manner, in the first, sliding configuration as shown in FIG. 7A, the nails 707 may substantially bend, flex, and slide along portions of items and/or portions of an environment or container in order to grasp and cage an item using the fingers and/or nails 707.

In addition, the nails 707 may facilitate grasping or caging an item by contacting or gripping one or more portions of the item, potentially in addition to grasping by one or more fingers and/or engagement by one or more suction cups. For example, the nails 707 may facilitate caging of the item within the fingers and nails 707 and proximate the suction cup, so that the item may be more securely and reliably grasped and thereby reduce potential damage to the item during grasping and movement.

In the example of FIGS. 7A and 7B, in the second, grasping configuration as shown in FIG. 7B, the actuator 719 may induce or cause vibration of the nails 707 according to a second, emitted vibration profile 730-2 such that the nails 707 exhibit lower flexibility and/or higher friction in this second configuration. For example, various different vibration profiles may cause various types of materials to exhibit higher friction properties. In this manner, in a second, grasping configuration as shown in FIG. 7B, the nails 707 may substantially grasp portions of an item in order to grasp and cage the item using the fingers and/or nails 707.

The actuators 719 that may emit various vibration profiles to affect friction properties of the nails 707 associated with two or more configurations, e.g., first, lower friction and second, higher friction configurations, may include vibration transducers, speaker coils, piezoelectric elements or films, various other types of vibration or waveform emitters, or combinations thereof. In example embodiments, actuation or vibration of the nails 707 may occur separately from or substantially simultaneously with actuation of the fingers as described herein, e.g., movements of the fingers between the open and closed positions.

Although FIGS. 7A and 7B illustrate a particular size, shape, dimensions, configuration, and arrangement of portions of an example nail, other example embodiments may include other sizes, shapes, dimensions, configurations, or arrangements of the various portions of an example nail of the end effectors described herein. For example, other example nails may have a triangular, rectangular, square, oval, oblong, fork, or other shape, may have various other surfaces, edges, or corners, may be formed of various different materials, different numbers of layers of materials, and/or different thicknesses of materials, may include various protrusions, bumps, ridges, grooves, dimples, or other surface features, etc.

Figure 8:
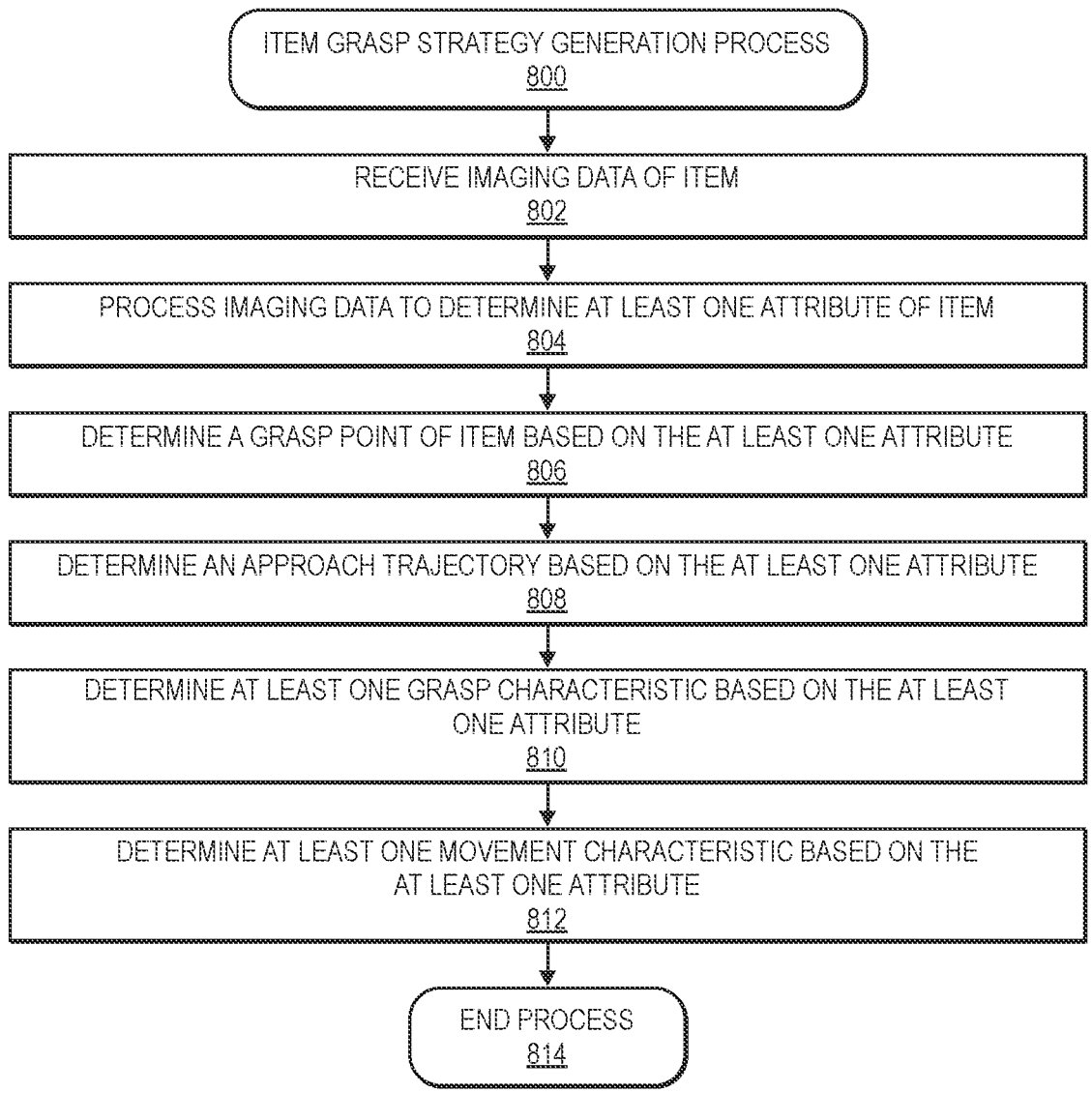
FIG. 8 is a flow diagram illustrating an example item grasp strategy generation process, in accordance with implementations of the present disclosure.

FIG. 8 is a flow diagram illustrating an example item grasp strategy generation process 800, in accordance with implementations of the present disclosure.

The process 800 may begin by receiving imaging data of an item, as at 802. For example, one or more imaging devices, cameras, imaging sensors, or other types of imaging devices may capture imaging data of an item. The imaging data may include a representation of the item, as well as representations of other items and/or portions of the environment or container proximate the item. Further, a control system may receive the imaging data of the item.

The process 800 may continue by processing the imaging data to determine at least one attribute of the item, as at 804. For example, the imaging data may be processed using various types of image recognition techniques or algorithms, e.g., edge detection, surface detection, feature detection, object detection, machine learning, and/or various other types of image recognition or computer vision techniques or algorithms. Based on the processing of the imaging data, one or more attributes or characteristics of the item may be determined, such as an item type, identity, shape, size, dimensions, weight, volume, pose including position and/or orientation, packaging material, packaging attributes including seams, corners, edges, hinges, flaps, covers, lids, or others, position and/or orientation relative to one or more other items in proximity, position and/or orientation relative to portions of an environment or container, and/or various other attributes or characteristics of items. Further, a control system may process the imaging data to determine at least one attribute of the item.

The process 800 may proceed by determining a grasp point of the item based on the at least one attribute, as at 806. For example, one or more grasp points of the item may be determined using various processing algorithms, such as edge detection, surface detection, feature detection, machine learning, and/or various other processing techniques or algorithms, as well as based on the at least one attribute of the item. For books, magazines, or similar items, the grasp points may include portions, surfaces, or edges along spines or bindings of the items. For boxes or containers with openable lids or covers, the grasp points may include seams or interfaces between covers and other static portions of the containers. For items in flexible or plastic packaging, the grasp points may include corners, edges, or seams of the flexible packaging. Various other grasp points may be determined and used to grasp various types of items. Further, a control system may determine a grasp point of the item.

The process 800 may continue to determine an approach trajectory based on the at least one attribute, as at 808. For example, one or more approach trajectories may be determined based on the determined grasp point using various processing algorithms, such as motion planning optimization algorithms, dense robot streaming motion interfaces, heuristics, machine learning algorithms, and/or various other techniques or algorithms, as well as based on the at least one attribute of the item. The approach trajectories may include particular positions and/or orientations of a robotic end effector to move toward and initiate grasping of an item. Example approach trajectories may also include various types of grasping techniques, such as picking, scooping, sliding, pushing, turning, re-orienting, and/or other techniques or movements. Further, a control system may determine an approach trajectory to grasp the item.

The process 800 may proceed to determine at least one grasp characteristic based on the at least one attribute, as at 810. For example, one or more grasp characteristics may be determined based on the determined approach trajectory and/or the determined grasp point, as well as based on the at least one attribute of the item. The grasp characteristics may include grasping sequences, suction forces, item adjustments or movements, grasping forces, scooping or sliding forces, other forces or operations, or other grasp characteristics of the item. Example grasp characteristics may include suction forces to engage the item with a suction cup, movements or adjustments by a robotic arm to move, re-orient, re-image, or singulate the item, grasping or pinching forces exerted by grasping fingers and/or nails, sequences of suction, grasping, caging, picking, sliding, scooping, adjusting, or various other operations, and/or various other grasp characteristics. Further, a control system may determine a grasp characteristic for the item.

The process 800 may then continue with determining at least one movement characteristic based on the at least one attribute, as at 812. For example, one or more movement characteristics may be determined based on the determined grasp characteristic, the determined approach trajectory, and/or the determined grasp point, as well as based on the at least one attribute of the item. The movement characteristics may include movement types, movement sequences, directions, speeds, accelerations, or other movement characteristics of the item. Example movement characteristics may include vertical or horizontal translation, rotational movements, sliding, pushing, pulling, or dragging movements, various speeds, various accelerations, combinations or sequences of different movements, and/or various other movement characteristics. Further, a control system may determine a movement characteristic for the item.

As described herein, the determined attributes of an item, grasp points, approach trajectories, grasp characteristics, and/or movement characteristics may comprise portions of an item grasp strategy for the item. The process 800 may then end, as at 814.

In additional example embodiments, the process 800 may be repeated any number of times and at various stages of operation of an item grasping process as further described herein. For example, imaging data may be received periodically or continuously during various stages of operation of an item grasping process, and various of the attributes of an item, grasp points, approach trajectories, grasp characteristics, and/or movement characteristics may be determined based on additional imaging data during various stages of operation of an item grasping process.

Figure 9:
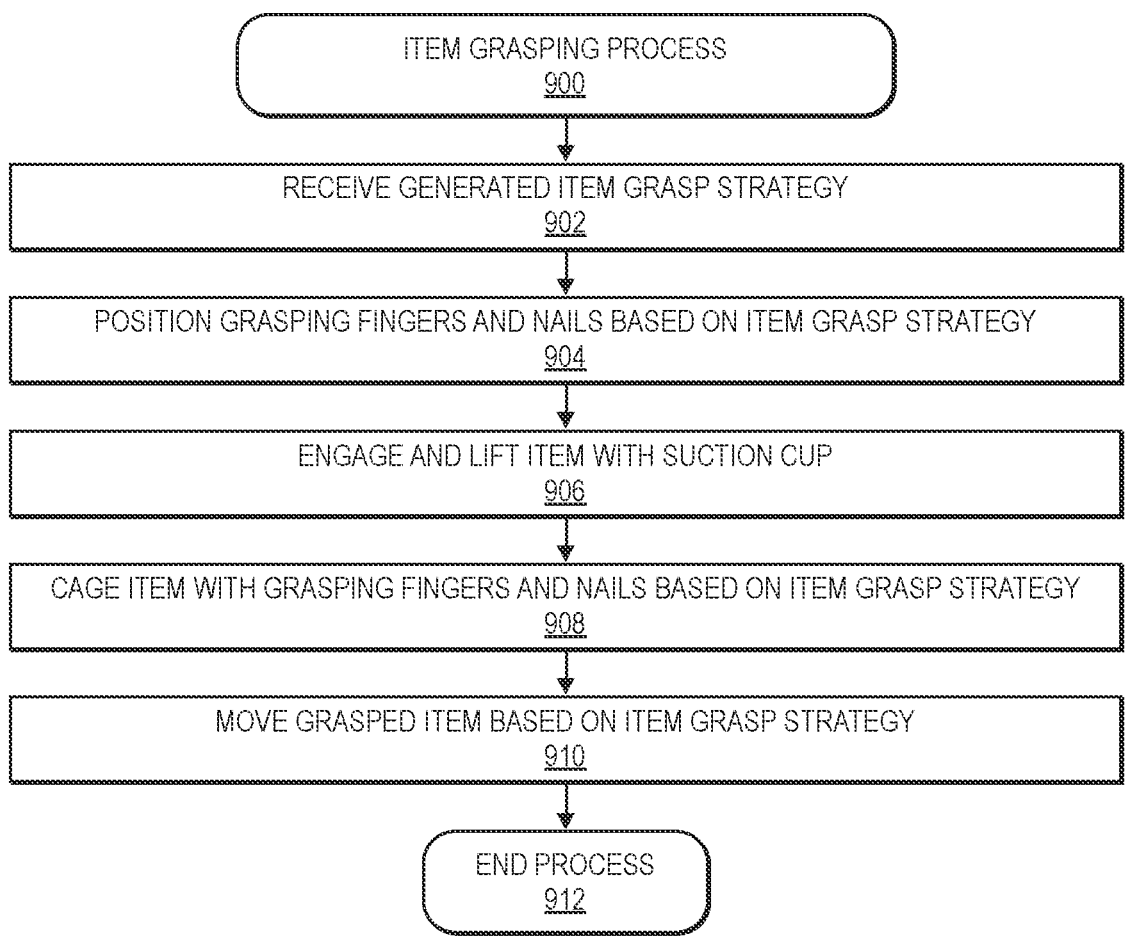
FIG. 9 is a flow diagram illustrating an example item grasping process, in accordance with implementations of the present disclosure.

FIG. 9 is a flow diagram illustrating an example item grasping process 900, in accordance with implementations of the present disclosure.

The process 900 may begin by receiving a generated item grasp strategy, as at 902. For example, the item grasp strategy may comprise determined attributes of an item, grasp points, approach trajectories, grasp characteristics, and/or movement characteristics for the item. Further, a control system may receive an item grasp strategy for the item.

The process 900 may continue by positioning grasping fingers and nails based on the item grasp strategy, as at 904. For example, based at least in part on the determined grasp point and approach trajectory, a robotic arm may move a robotic end effector to a particular position and/or orientation relative to the item, in order to advance toward the item along the approach trajectory and subsequently grasp the item at the grasp point. In addition, the grasping fingers and flexible nails of the robotic end effector may be moved or actuated to particular positions, orientations, or configurations to facilitate movement toward and initial engagement or grasping of the item. Further, a control system may instruct positioning of the robotic arm and robotic end effector based on the item grasp strategy.

The process 900 may proceed by engaging and lifting the item with a suction cup, as at 906. For example, portions of the item grasp strategy, e.g., one or more grasp characteristics, may indicate that the item is to be initially engaged by a suction cup of the robotic end effector with defined suction forces, and/or according to defined sequences of operations. In addition, the engagement of the item by the suction cup may cause movement, lifting, or other adjustment to a position and/or orientation of the item relative to a support surface. Further, a control system may instruct engagement and lifting of the item by the suction cup of the robotic end effector.

The process 900 may continue to cage the item with grasping fingers and nails based on the item grasp strategy, as at 908. For example, additional portions of the item grasp strategy, e.g., one or more additional grasp characteristics, may indicate that the item is to be grasped and caged by grasping fingers and flexible nails of the robotic end effector with defined grasping, pinching, sliding, or other forces or operations, and/or according to defined sequences of operations. The grasping fingers may be actuated or moved from an open position to a closed position in order to grasp the item. In addition, the flexible nails may also be moved or actuated to transition from an open or sliding configuration to a closed or grasping configuration. The fingers and nails may be actuated substantially simultaneously, the fingers may be actuated in a sequence before actuation of the nails, or the nails may be actuated in a sequence before actuation of the fingers. The grasping and caging of the item by the fingers and nails may enable more secure and reliable grasping and movement of the item by the robotic end effector. Further, a control system may instruct grasping and caging of the item by the fingers and/or nails of the robotic end effector.

The process 900 may then proceed to move the grasped item based on the item grasp strategy, as at 910. For example, portions of the item grasp strategy, e.g., one or more movement characteristics, may indicate that the item is to be moved by the robotic end effector according to defined movements, directions, speeds, accelerations, or other movement characteristics, and/or according to defined sequences of movements. The movement characteristics may be defined based at least in part on the grasp characteristics to ensure secure and reliable movement of the item by the robotic end effector. Further, a control system may instruct movement of the item by the robotic arm and robotic end effector.

The process 900 may then end, as at 912.

Figure 10:
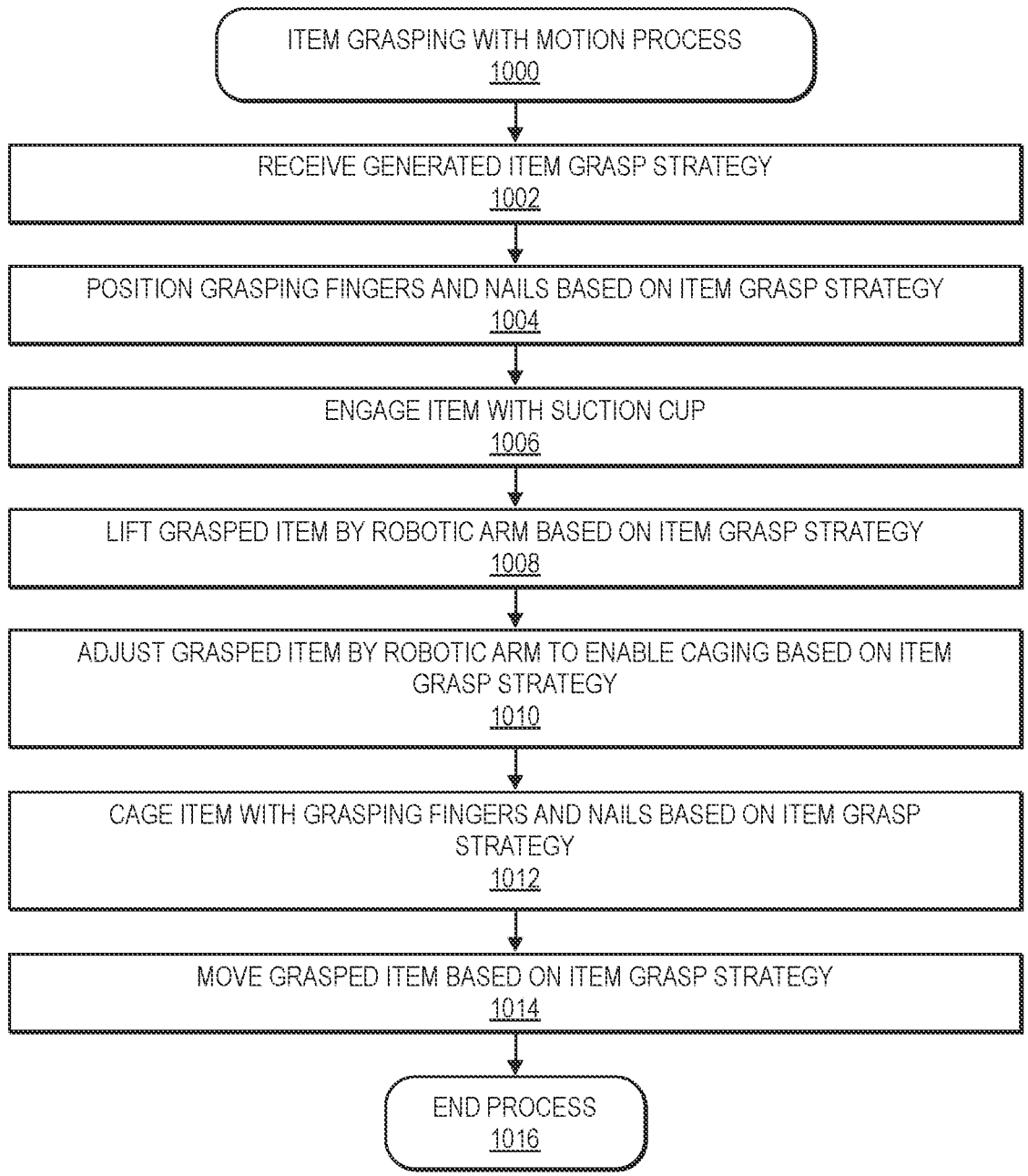
FIG. 10 is a flow diagram illustrating an example item grasping with motion process, in accordance with implementations of the present disclosure.

FIG. 10 is a flow diagram illustrating an example item grasping with motion process 1000, in accordance with implementations of the present disclosure.

The process 1000 may begin by receiving a generated item grasp strategy, as at 1002. For example, the item grasp strategy may comprise determined attributes of an item, grasp points, approach trajectories, grasp characteristics, and/or movement characteristics for the item. Further, a control system may receive an item grasp strategy for the item.

The process 1000 may continue by positioning grasping fingers and nails based on the item grasp strategy, as at 1004. For example, based at least in part on the determined grasp point and approach trajectory, a robotic arm may move a robotic end effector to a particular position and/or orientation relative to the item, in order to advance toward the item along the approach trajectory and subsequently grasp the item at the grasp point. In addition, the grasping fingers and flexible nails of the robotic end effector may be moved or actuated to particular positions, orientations, or configurations to facilitate movement toward and initial engagement or grasping of the item. Further, a control system may instruct positioning of the robotic arm and robotic end effector based on the item grasp strategy.

The process 1000 may proceed by engaging the item with a suction cup, as at 1006. For example, portions of the item grasp strategy, e.g., one or more grasp characteristics, may indicate that the item is to be initially engaged by a suction cup of the robotic end effector with defined suction forces, and/or according to defined sequences of operations. Further, a control system may instruct engagement of the item by the suction cup of the robotic end effector.

The process 1000 may continue to lift the grasped item by the robotic arm based on the item grasp strategy, as at 1008. For example, portions of the item grasp strategy, e.g., one or more grasp characteristics, may indicate that the item is to be at least partially lifted from one or more support surfaces. Responsive or subsequent to engagement of the item by the suction cup, the robotic arm and robotic end effector may move or actuate to lift the grasped item away from one or more support surfaces. The item may be lifted in order to facilitate grasping and caging of one or more portions of the item by the grasping fingers and/or flexible nails of the robotic end effector. For example, the item may be lifted away from a support surface to provide space or clearance for sliding or inserting of one or more fingers and/or nails between the item and the support surface. Further, a control system may instruct lifting of the item by the robotic arm and robotic end effector.

The process 1000 may then proceed to adjust the grasped item by the robotic arm to enable caging based on the item grasp strategy, as at 1010. For example, portions of the item grasp strategy, e.g., one or more grasp characteristics, may indicate that the item is to be moved, rotated, repositioned, reoriented, or otherwise adjusted to facilitate grasping and caging of the item. The robotic arm and robotic end effector may translate and/or rotate the item to a particular position and/or orientation, and/or may slide, push, pull, and/or drag the item relative to one or more support surfaces and/or one or more other items in proximity. In some examples, movable, openable, or flexible items, such as items in flexible or plastic bags or packaging, may be moved, reoriented, or adjusted to facilitate grasping and caging of the item. Further, a control system may instruct adjustment of the grasped item by the robotic arm and robotic end effector.

The process 1000 may continue with caging the item with grasping fingers and nails based on the item grasp strategy, as at 1012. For example, additional portions of the item grasp strategy, e.g., one or more additional grasp characteristics, may indicate that the item is to be grasped and caged by grasping fingers and flexible nails of the robotic end effector with defined grasping, pinching, sliding, or other forces or operations, and/or according to defined sequences of operations. The grasping fingers may be actuated or moved from an open position to a closed position in order to grasp the item. In addition, the flexible nails may also be moved or actuated to transition from an open or sliding configuration to a closed or grasping configuration. The fingers and nails may be actuated substantially simultaneously, the fingers may be actuated in a sequence before actuation of the nails, or the nails may be actuated in a sequence before actuation of the fingers. The grasping and caging of the item by the fingers and nails may enable more secure and reliable grasping and movement of the item by the robotic end effector. Further, a control system may instruct grasping and caging of the item by the fingers and/or nails of the robotic end effector.

The process 1000 may then proceed with moving the grasped item based on the item grasp strategy, as at 1014. For example, portions of the item grasp strategy, e.g., one or more movement characteristics, may indicate that the item is to be moved by the robotic end effector according to defined movements, directions, speeds, accelerations, or other movement characteristics, and/or according to defined sequences of movements. The movement characteristics may be defined based at least in part on the grasp characteristics to ensure secure and reliable movement of the item by the robotic end effector. Further, a control system may instruct movement of the item by the robotic arm and robotic end effector.

The process 1000 may then end, as at 1016.

As described herein, the item grasp strategy generation process 800 may be repeated any number of times and at various stages of operation of an item grasping process as further described herein. In one additional example item grasping process, an item may be initially engaged by one or more fingers and/or nails based on a determined grasp point and approach trajectory. Then, the item may be moved, reoriented, or otherwise manipulated to singulate the item from other items in proximity based on one or more determined grasp characteristics, e.g., a sequence of movements or rotations at determined speeds and/or directions. Then, the item grasp strategy generation process 800 may be repeated based on additional imaging data received during and/or after the item has been moved or reoriented to determine a new item grasp strategy, and/or portions thereof. The new item grasp strategy may comprise a new grasp point, new approach trajectory, one or more new grasp characteristics, and/or one or more new movement characteristics in order to grasp and/or cage the item and transfer or move the item. Based on the new item grasp strategy, a robotic arm with an end effector having one more fingers and/or nails may be instructed to grasp and/or cage the item.

As a result, the item grasp strategy generation process and various example embodiments of item grasping processes described herein may be performed iteratively and/or repetitively in order to effectively grasp and/or cage items using end effectors having one or more fingers and/or nails described herein.

Figure 11:
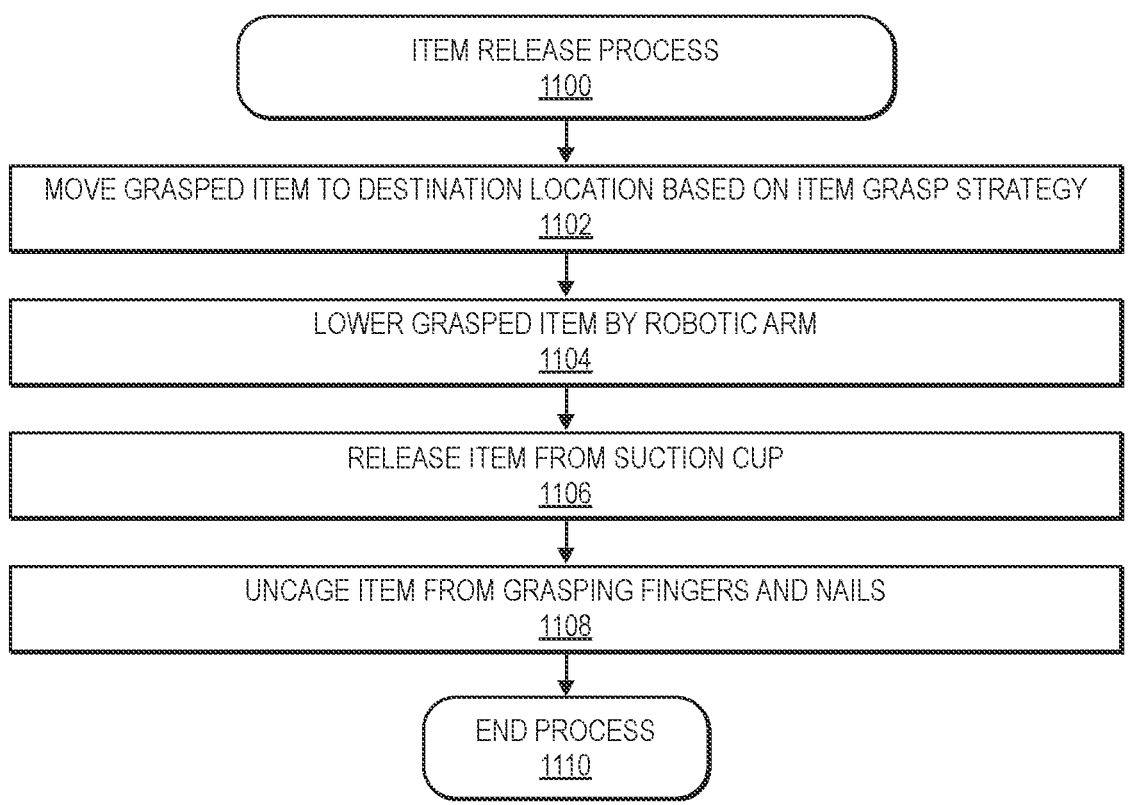
FIG. 11 is a flow diagram illustrating an example item release process, in accordance with implementations of the present disclosure.

FIG. 11 is a flow diagram illustrating an example item release process 1100, in accordance with implementations of the present disclosure.

The process 1100 may begin by moving a grasped item to a destination location based on an item grasp strategy, as at 1102. For example, portions of the item grasp strategy, e.g., one or more movement characteristics, may indicate that the item is to be moved to the destination location by the robotic end effector according to defined movements, directions, speeds, accelerations, or other movement characteristics, and/or according to defined sequences of movements. The movement characteristics may be defined based at least in part on the grasp characteristics to ensure secure and reliable movement of the item by the robotic end effector. The destination location may be any destination, such as a container, bin, tray, box, pallet, workstation, table, conveyance mechanism, or various other locations. Further, a control system may instruct movement of the item to the destination location by the robotic arm and robotic end effector.

The process 1100 may continue by lowering the grasped item by the robotic arm, as at 1104. For example, based on the one or more movement characteristics determined for the item, the robotic arm and robotic end effector may move or lower the item toward the destination location. During at least part of the lowering of the item, the suction cup may maintain engagement with the item, and the fingers and/or nails may maintain grasping and caging of the item, such that the item remains securely and reliably grasped during the movement. Further, a control system may instruct lowering of the item by the robotic arm and robotic end effector.

The process 1100 may proceed by releasing the item from the suction cup, as at 1106. For example, vacuum or negative pressure may no longer by applied to the suction cup, and/or positive pressure may be applied to the suction cup, in order to disengage the item from the suction cup. During the disengagement from the suction cup, the fingers and/or nails may maintain grasping and caging of the item, such that the item remains at least partially grasped during the movement. Further, a control system may instruct release of the item from the suction cup of the robotic end effector.

The process 1100 may continue to uncage the item from the grasping fingers and nails, as at 1108. For example, the grasping fingers may be actuated or moved from a closed position to an open position in order to release the item. In addition, the flexible nails may also be moved or actuated to transition from a closed or grasping configuration to an open or sliding configuration. The fingers and nails may be actuated substantially simultaneously, the fingers may be actuated in a sequence before actuation of the nails, or the nails may be actuated in a sequence before actuation of the fingers. Further, a control system may instruct uncaging of the item from the fingers and/or nails of the robotic end effector.

In some example embodiments, the fingers and nails may be actuated to release the item subsequent to disengagement of the item from the suction cup. In further example embodiments, the suction cup and fingers and/or nails may be actuated substantially simultaneously to disengage and release the item from the robotic end effector. In other example embodiments, the suction cup may be actuated to disengage the item subsequent to release of the item from the fingers and nails.

The process 1100 may then end, as at 1110.

Figure 12:
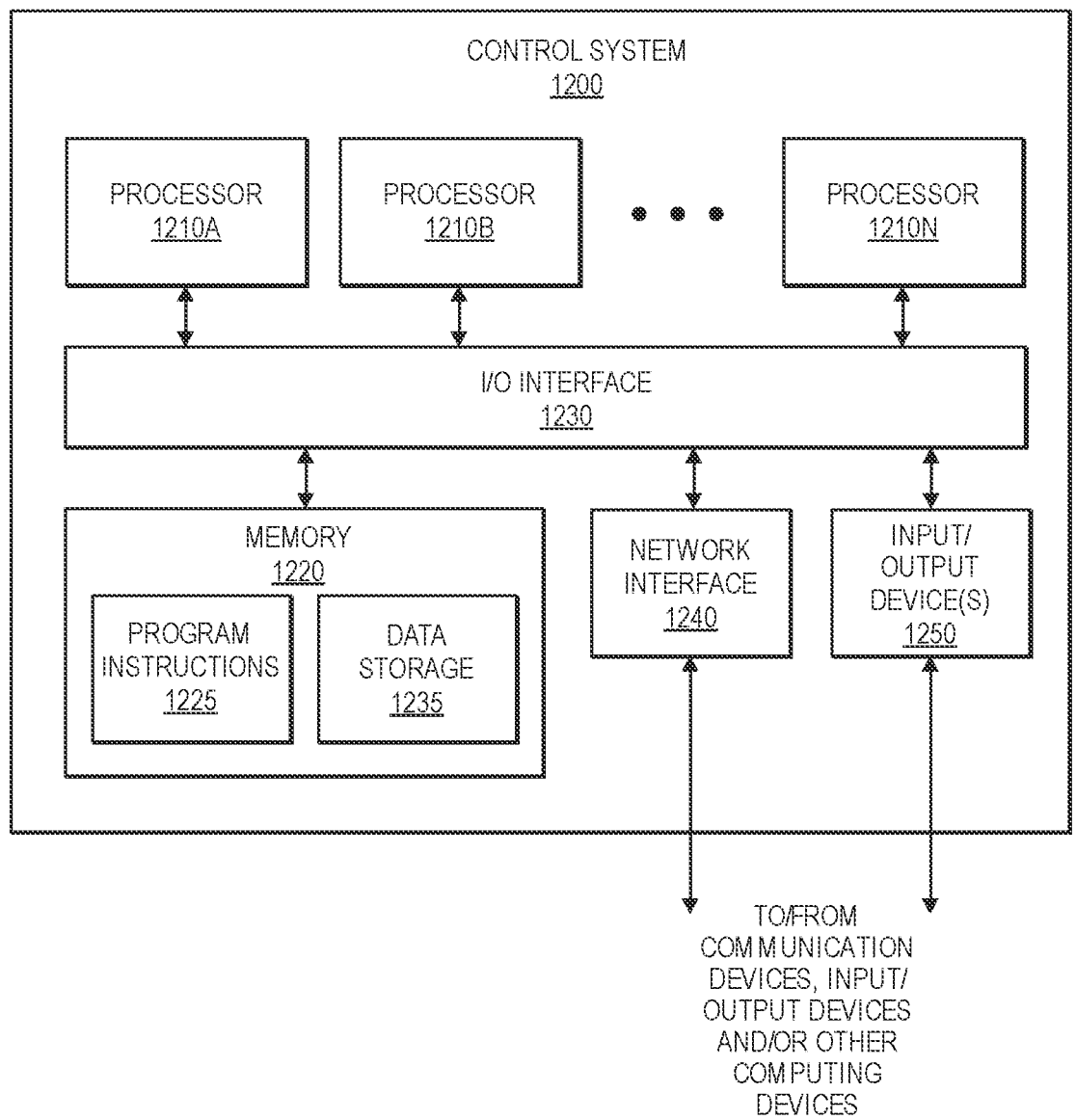
FIG. 12 is a block diagram illustrating various components of an example control system, in accordance with implementations of the present disclosure.

FIG. 12 is a block diagram illustrating various components of an example control system 1200, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 12. In the illustrated implementation, a control system 1200 includes one or more processors 1210A, 1210B through 1210N, coupled to a non-transitory computer-readable storage medium 1220 via an input/output (I/O) interface 1230. The control system 1200 further includes a network interface 1240 coupled to the I/O interface 1230, and one or more input/output devices 1250. In some implementations, it is contemplated that a described implementation may be implemented using a single instance of the control system 1200 while, in other implementations, multiple such systems or multiple nodes making up the control system 1200 may be configured to host different portions or instances of the described implementations. For example, in one implementation, some data sources or services (e.g., related to portions of robotic end effector systems, operations, or processes, etc.) may be implemented via one or more nodes of the control system 1200 that are distinct from those nodes implementing other data sources or services (e.g., related to other portions of robotic end effector systems, operations, or processes, etc.).

In various implementations, the control system 1200 may be a uniprocessor system including one processor 1210A, or a multiprocessor system including several processors 1210A-1210N (e.g., two, four, eight, or another suitable number). The processors 1210A-1210N may be any suitable processor capable of executing instructions. For example, in various implementations, the processors 1210A-1210N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1210A-1210N may commonly, but not necessarily, implement the same ISA.

The non-transitory computer-readable storage medium 1220 may be configured to store executable instructions and/or data accessible by the one or more processors 1210A-1210N. In various implementations, the non-transitory computer-readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1220 as program instructions 1225 and data storage 1235, respectively. In other implementations, program instructions and/or data may be received, sent or stored upon different types of computer-accessible media, such as non-transitory media, or on similar media separate from the non-transitory computer-readable storage medium 1220 or the control system 1200. Generally speaking, a non-transitory, computer-readable storage medium may include storage media or memory media such as magnetic or optical media, e.g., disk or CD/DVD-ROM, coupled to the control system 1200 via the I/O interface 1230. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1240.

In one implementation, the I/O interface 1230 may be configured to coordinate I/O traffic between the processors 1210A-1210N, the non-transitory computer-readable storage medium 1220, and any peripheral devices, including the network interface 1240 or other peripheral interfaces, such as input/output devices 1250. In some implementations, the I/O interface 1230 may perform any necessary protocol, timing or other data transformations to convert data signals from one component (e.g., non-transitory computer-readable storage medium 1220) into a format suitable for use by another component (e.g., processors 1210A-1210N). In some implementations, the I/O interface 1230 may include support for devices attached through various types of peripheral buses, such as a variant of the Peripheral Component Interconnect (PCI) bus standard or the Universal Serial Bus (USB) standard, for example. In some implementations, the function of the I/O interface 1230 may be split into two or more separate components, such as a north bridge and a south bridge, for example. Also, in some implementations, some or all of the functionality of the I/O interface 1230, such as an interface to the non-transitory computer-readable storage medium 1220, may be incorporated directly into the processors 1210A-1210N.

The network interface 1240 may be configured to allow data to be exchanged between the control system 1200 and other devices attached to a network, such as other control systems, material handling system controllers, warehouse management systems, other computer systems, robotic arms, machines, or systems, robotic end effector apparatus, machines, or systems (and components thereof), various types of actuators, various types of sensors, various types of vision systems, imaging devices, or imaging sensors, upstream stations or processes, downstream stations or processes, other material handling systems or equipment, or between nodes of the control system 1200. In various implementations, the network interface 1240 may support communication via wired or wireless general data networks, such as any suitable type of Ethernet network.

Input/output devices 1250 may, in some implementations, include one or more displays, projection devices, touchscreens, touchpads, visual input/output devices, speakers, microphones, audio input/output devices, keyboards, keypads, scanning devices, imaging devices, sensors, photo eyes, proximity sensors, RFID readers, voice or optical recognition devices, or any other devices suitable for entering or retrieving data by one or more control systems 1200. Multiple input/output devices 1250 may be present in the control system 1200 or may be distributed on various nodes of the control system 1200. In some implementations, similar input/output devices may be separate from the control system 1200 and may interact with one or more nodes of the control system 1200 through a wired or wireless connection, such as over the network interface 1240.

As shown in FIG. 12, the memory 1220 may include program instructions 1225 that may be configured to implement one or more of the described implementations and/or provide data storage 1235, which may comprise various tables, data stores and/or other data structures accessible by the program instructions 1225. The program instructions 1225 may include various executable instructions, programs, or applications to facilitate robotic end effector operations and processes described herein, such as robotic arm, machine, or apparatus controllers, drivers, or applications, robotic end effector apparatus controllers, drivers, or applications, actuator controllers, drivers, or applications, sensor controllers, drivers, or applications, sensor data processing applications, vision system or imaging device controllers, drivers, or applications, imaging data processing applications, material handling equipment controllers, drivers, or applications, upstream station controllers, drivers, or applications, downstream station controllers, drivers, or applications, etc. The data storage 1235 may include various data stores for maintaining data related to systems, operations, or processes described herein, such as robotic arms, machines, or apparatus, robotic end effector apparatus or systems, suction cups, grasping fingers, flexible nails, actuators, sensors, sensor data, vision systems or imaging devices, imaging data, environments, containers, items or objects, item or object data, grasp points, approach trajectories, grasp characteristics, movement characteristics, material handling equipment or apparatus, upstream systems, stations, or processes, downstream systems, stations, or processes, etc.

Those skilled in the art will appreciate that the control system 1200 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1200 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 8-11, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An item grasping apparatus, comprising:
   a robotic arm;
   an end effector coupled to the robotic arm, the end effector comprising:
     a suction cup;
     a plurality of grasping fingers; and
     a plurality of flexible nails, individual ones of the plurality of flexible nails being coupled to respective ones of the plurality of grasping fingers;
     wherein individual ones of the plurality of flexible nails include a variable friction along a length of respective flexible nails; and
   a control system in communication with the robotic arm and the end effector, the control system configured to at least:
     instruct, using the suction cup, engagement of an item by the robotic arm and the end effector; and
     instruct, using the plurality of grasping fingers and the plurality of flexible nails, at least one of grasping or caging of the item by the end effector;
     wherein the plurality of flexible nails are configured to slide between at least one portion of the item and at least one support surface proximate the item.

2. The item grasping apparatus of claim 1, wherein the control system is further configured to:
   subsequent to the engagement of the item using the suction cup, instruct, using the robotic arm, movement of the item relative to the at least one support surface to facilitate the caging of the item using the plurality of grasping fingers and the plurality of flexible nails.

3. The item grasping apparatus of claim 1, wherein the plurality of grasping fingers are actuatable between an open position and a closed position.

4. The item grasping apparatus of claim 1, wherein the plurality of flexible nails have lower flexibility at respective portions that are coupled to the respective ones of the plurality of grasping fingers, and have higher flexibility at respective ends away from the respective ones of the plurality of grasping fingers.

5. The item grasping apparatus of claim 1, wherein the plurality of flexible nails are actuatable between a first, sliding configuration and a second, grasping configuration.

6. A robotic end effector, comprising:
   a suction cup configured to engage an item;
   at least one grasping finger configured to move between an open position and a closed position to grasp the item; and
   at least one flexible nail coupled to the at least one grasping finger, wherein the at least one flexible nail is configured to slide relative to the item in a first, sliding position, and is configured to at least one of grasp or cage the item in a second, grasping position;
   wherein the at least one flexible nail includes a variable friction along a length of the at least one flexible nail.

7. The robotic end effector of claim 6, wherein the at least one grasping finger comprises a plurality of grasping fingers arranged around the suction cup; and
   wherein the at least one flexible nail comprises a plurality of flexible nails coupled to respective ones of the plurality of grasping fingers.

8. The robotic end effector of claim 6, wherein the at least one grasping finger is formed of at least one of silicone, rubber, plastic, composite, or metal; and
   wherein the at least one flexible nail is formed of at least one of silicone, rubber, plastic, composite, or metal.

9. The robotic end effector of claim 6, further comprising:
   an actuator coupled to the at least one grasping finger and configured to move the at least one grasping finger between the open position and the closed position;
   wherein the actuator comprises at least one of a pneumatic actuator, a servo, a solenoid, a motor, or a shape memory alloy.

10. The robotic end effector of claim 6, wherein the at least one flexible nail includes a variable flexibility along the length of the at least one flexible nail.

11. The robotic end effector of claim 10, wherein the variable flexibility is formed by at least one of different materials, different numbers of layers of materials, or different thicknesses of materials along the length of the at least one flexible nail.

12. A robotic end effector, comprising:
   a suction cup configured to engage an item;
   at least one grasping finger configured to move between an open position and a closed position to grasp the item; and
   at least one flexible nail coupled to the at least one grasping finger, wherein the at least one flexible nail is configured to slide relative to the item in a first, sliding position, and is configured to at least one of grasp or cage the item in a second, grasping position;
   wherein the at least one flexible nail is foldable along a length of the at least one flexible nail;
   wherein the first, sliding position includes an unfolded configuration of the at least one flexible nail; and
   wherein the second, grasping position includes a folded configuration of the at least one flexible nail.

13. A robotic end effector, comprising:
   a suction cup configured to engage an item;
   at least one grasping finger configured to move between an open position and a closed position to grasp the item; and
   at least one flexible nail coupled to the at least one grasping finger, wherein the at least one flexible nail is configured to slide relative to the item in a first, sliding position, and is configured to at least one of grasp or cage the item in a second, grasping position;
   wherein the at least one flexible nail includes a stiffening rod that extends into or retracts from the at least one flexible nail;
   wherein the first, sliding position includes a retracted configuration of the stiffening rod relative to the at least one flexible nail; and
   wherein the second, grasping position includes an extended configuration of the stiffening rod relative to the at least one flexible nail.

14. A robotic end effector, comprising:
   a suction cup configured to engage an item;
   at least one grasping finger configured to move between an open position and a closed position to grasp the item; and
   at least one flexible nail coupled to the at least one grasping finger, wherein the at least one flexible nail is configured to slide relative to the item in a first, sliding position, and is configured to at least one of grasp or cage the item in a second, grasping position;

wherein the at least one flexible nail includes a vibration transducer;

wherein the first, sliding position includes a first vibration profile emitted by the vibration transducer; and wherein the second, grasping position includes a second vibration profile emitted by the vibration transducer.

15. An item grasping method, comprising:

determining, by a control system, at least one characteristic of an item;

determining, by the control system, a grasp point of the item based on the at least one characteristic;

determining, by the control system, an approach trajectory based on the at least one characteristic;

determining, by the control system, a grasp characteristic based on the at least one characteristic;

instructing, by the control system, movement of a robotic arm having an end effector based on the approach trajectory and the grasp point, the end effector including a suction cup, at least one grasping finger configured to move between an open position and a closed position, and at least one flexible nail coupled to the at least one grasping finger;

instructing, by the control system and with the at least one grasping finger in the open position, sliding of the at least one flexible nail relative to the item and at least one support surface; and instructing, by the control system and with the at least one grasping finger in the closed position, grasping of the item by the at least one flexible nail;

wherein the sliding of the at least one flexible nail relative to the item and the grasping of the item by the at least one flexible nail are instructed based at least in part on the grasp characteristic.

16. The item grasping method of claim 15, further comprising:

receiving, by the control system from an imaging device, imaging data of the item; and processing, by the control system, the imaging data of the item;

wherein the at least one characteristic of the item is determined based on the imaging data.

17. The item grasping method of claim 15, further comprising:

determining, by the control system, a movement characteristic based on the at least one characteristic; and instructing, by the control system and with the at least one grasping finger in the closed position, movement of the item based at least in part on the movement characteristic.

18. The item grasping method of claim 15, further comprising:

instructing, by the control system, engagement of the item by the suction cup of the end effector; and instructing, by the control system, lifting of the item by at least one of the suction cup or the robotic arm to facilitate the sliding of the at least one flexible nail relative to the item and the grasping of the item by the at least one flexible nail.

19. The item grasping method of claim 15, wherein the grasp characteristic comprises at least one of a grasping type, a grasping sequence, or a grasping force.

20. The item grasping method of claim 19, wherein the grasping type comprises at least one of picking, scooping, sliding, pushing, turning or re-orienting the item.

* * * * *